United States Patent
LeMay et al.

(10) Patent No.: US 7,934,994 B2
(45) Date of Patent: May 3, 2011

(54) VIRTUAL CAMERAS AND 3-D GAMING ENVIRONMENTS IN A GAMING MACHINE

(75) Inventors: Steven G. LeMay, Reno, NV (US);
Jamal Benbrahim, Reno, NV (US);
Richard E. Rowe, Las Vegas, NV (US);
Robert E. Breckner, Reno, NV (US);
Nicole M. Beaulieu, Reno, NV (US);
Greg A. Schlottmann, Reno, NV (US)

(73) Assignee: IGT, Reno, NV (US)

( * ) Notice: Subject to any disclaimer, the term of this patent is extended or adjusted under 35 U.S.C. 154(b) by 8 days.

(21) Appl. No.: 12/264,877

(22) Filed: Nov. 4, 2008

(65) Prior Publication Data
US 2009/0062001 A1    Mar. 5, 2009

Related U.S. Application Data

(60) Division of application No. 11/112,076, filed on Apr. 22, 2005, now Pat. No. 7,465,230, which is a continuation of application No. 09/927,901, filed on Aug. 9, 2001, now Pat. No. 6,887,157.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........... 463/32; 273/237; 715/782; 715/836; 715/838; 715/850; 463/25; 463/40; 463/41; 463/42

(58) Field of Classification Search .............. 463/32
See application file for complete search history.

(56) References Cited

U.S. PATENT DOCUMENTS

| 4,332,389 A | 6/1982 | Loyd et al. |
| 4,365,810 A | 12/1982 | Richardson |
| 4,373,726 A | 2/1983 | Churchill et al. |

(Continued)

FOREIGN PATENT DOCUMENTS
AU    200179477    5/2002
(Continued)

OTHER PUBLICATIONS

U.S. Office Action dated Feb. 22, 2007 from related U.S. Appl. No. 10/272,788, 9 pgs.

(Continued)

*Primary Examiner* — John M. Hotaling, II
*Assistant Examiner* — Paul A. D'Agostino
(74) *Attorney, Agent, or Firm* — Weaver Austin Villeneuve & Sampson LLP

(57) ABSTRACT

A disclosed gaming machine provides method and apparatus for presenting a plurality of game outcome presentations derived from one or more virtual 3-D gaming environments stored on the gaming machine. While a game of chance is being played on the gaming machine, two-dimensional images derived from a three-dimensional object in the 3-D gaming environment may be rendered to a display screen on the gaming machine in real-time as part of the game outcome presentation. To add excitement to the game, a 3-D position of the 3-D object and other features of the 3-D gaming environment may be controlled by a game player. Nearly an unlimited variety of virtual objects, such as slot reels, gaming machines and casinos, may be modeled in the 3-D gaming environment.

25 Claims, 13 Drawing Sheets

U.S. PATENT DOCUMENTS

| | | |
|---|---|---|
| 4,455,025 A | 6/1984 | Itkis |
| 4,469,536 A | 9/1984 | Forester |
| 4,572,509 A | 2/1986 | Sitrick |
| 4,624,462 A | 11/1986 | Itkis |
| 4,634,126 A | 1/1987 | Kimura |
| 4,798,387 A | 1/1989 | Richardson |
| 4,823,345 A | 4/1989 | Daniel et al. |
| 4,848,771 A | 7/1989 | Richardson |
| 4,856,787 A * | 8/1989 | Itkis ..................... 273/237 |
| 4,885,703 A | 12/1989 | Deering |
| 4,914,607 A | 4/1990 | Takanashi et al. |
| 4,986,543 A | 1/1991 | Heller |
| 5,007,649 A | 4/1991 | Richardson |
| 5,227,771 A * | 7/1993 | Kerr et al. ..................... 715/800 |
| 5,242,163 A | 9/1993 | Fulton |
| 5,255,352 A | 10/1993 | Faulk |
| 5,297,802 A | 3/1994 | Pocock et al. |
| 5,303,388 A * | 4/1994 | Kreitman et al. ............. 715/836 |
| 5,339,390 A * | 8/1994 | Robertson et al. ............ 715/782 |
| 5,342,047 A | 8/1994 | Heidel et al. |
| 5,351,970 A | 10/1994 | Fioretti |
| 5,393,057 A | 2/1995 | Marnell, II |
| 5,435,554 A | 7/1995 | Lipson |
| 5,455,904 A * | 10/1995 | Bouchet et al. ................ 715/798 |
| 5,469,536 A | 11/1995 | Blank |
| 5,485,197 A * | 1/1996 | Hoarty ............................ 725/37 |
| 5,594,844 A * | 1/1997 | Sakai et al. ..................... 345/427 |
| 5,604,852 A | 2/1997 | Watters et al. |
| 5,608,850 A * | 3/1997 | Robertson ..................... 345/427 |
| 5,621,906 A | 4/1997 | O'Neill et al. |
| 5,639,088 A | 6/1997 | Schneider et al. |
| 5,643,086 A | 7/1997 | Alcorn et al. |
| 5,678,015 A * | 10/1997 | Goh ............................... 715/782 |
| 5,689,628 A * | 11/1997 | Robertson ..................... 345/427 |
| 5,729,673 A | 3/1998 | Cooper et al. |
| 5,742,779 A * | 4/1998 | Steele et al. .................... 715/839 |
| 5,745,109 A * | 4/1998 | Nakano et al. ................. 715/838 |
| 5,755,621 A | 5/1998 | Marks et al. |
| 5,766,074 A | 6/1998 | Cannon et al. |
| 5,775,993 A | 7/1998 | Fentz et al. |
| 5,788,573 A | 8/1998 | Baerlocher et al. |
| 5,805,783 A | 9/1998 | Ellson et al. |
| 5,807,172 A | 9/1998 | Piechowiak |
| 5,833,540 A | 11/1998 | Miodunski et al. |
| 5,836,819 A | 11/1998 | Ugawa |
| 5,880,733 A * | 3/1999 | Horvitz et al. ................ 715/850 |
| 5,903,271 A * | 5/1999 | Bardon et al. ................ 345/419 |
| 5,912,671 A * | 6/1999 | Oka ............................... 345/427 |
| 5,934,672 A | 8/1999 | Sines et al. |
| 5,941,772 A | 8/1999 | Paige |
| 5,956,038 A | 9/1999 | Rekimoto |
| 5,967,895 A | 10/1999 | Kellen |
| 5,998,803 A | 12/1999 | Forrest et al. |
| 6,002,403 A | 12/1999 | Sugiyama et al. |
| 6,002,853 A | 12/1999 | de Hond |
| 6,005,579 A | 12/1999 | Sugiyama et al. |
| 6,009,458 A | 12/1999 | Hawkins et al. |
| 6,012,984 A | 1/2000 | Roseman |
| 6,014,142 A | 1/2000 | LaHood |
| 6,023,371 A | 2/2000 | Onitsuka et al. |
| 6,027,115 A | 2/2000 | Griswold et al. |
| 6,029,973 A | 2/2000 | Takemoto |
| 6,031,545 A | 2/2000 | Ellenby et al. |
| 6,033,307 A | 3/2000 | Vancura |
| 6,043,818 A | 3/2000 | Nakano et al. |
| 6,050,895 A | 4/2000 | Luciano et al. |
| 6,057,856 A | 5/2000 | Miyashita et al. |
| 6,062,978 A * | 5/2000 | Martino et al. ................ 463/9 |
| 6,080,063 A | 6/2000 | Khosla |
| 6,089,976 A | 7/2000 | Schneider et al. |
| 6,093,100 A | 7/2000 | Singer et al. |
| 6,094,196 A * | 7/2000 | Berry et al. ..................... 715/852 |
| 6,104,815 A | 8/2000 | Alcorn et al. |
| 6,106,396 A | 8/2000 | Alcorn et al. |
| 6,131,909 A | 10/2000 | Chilese |
| 6,135,884 A | 10/2000 | Hedrick et al. |
| 6,149,156 A | 11/2000 | Feola |
| 6,149,522 A | 11/2000 | Alcorn et al. |
| 6,159,095 A | 12/2000 | Frohm et al. |
| 6,183,361 B1 | 2/2001 | Cummings et al. |
| 6,203,009 B1 | 3/2001 | Sines et al. |
| 6,203,428 B1 | 3/2001 | Giobbi et al. |
| 6,206,782 B1 | 3/2001 | Walker et al. |
| 6,220,593 B1 | 4/2001 | Pierce et al. |
| 6,234,901 B1 | 5/2001 | Nagoshi et al. |
| 6,254,483 B1 | 7/2001 | Acres |
| 6,267,669 B1 | 7/2001 | Luciano, Jr. et al. |
| 6,271,842 B1 * | 8/2001 | Bardon et al. ................. 715/848 |
| 6,280,325 B1 | 8/2001 | Fisk |
| 6,287,201 B1 * | 9/2001 | Hightower ..................... 463/41 |
| 6,315,666 B1 | 11/2001 | Mastera et al. |
| 6,319,128 B1 | 11/2001 | Miyoshi et al. |
| 6,331,146 B1 | 12/2001 | Miyamoto et al. |
| 6,332,838 B1 | 12/2001 | Yamagami |
| 6,342,892 B1 | 1/2002 | Van Hook et al. |
| 6,346,956 B2 | 2/2002 | Matsuda |
| 6,347,999 B1 | 2/2002 | Yuan |
| 6,390,470 B1 | 5/2002 | Huang |
| 6,398,218 B1 | 6/2002 | Vancura |
| 6,409,602 B1 * | 6/2002 | Wiltshire et al. ............... 463/42 |
| 6,409,604 B1 | 6/2002 | Matsuno |
| 6,413,162 B1 | 7/2002 | Baerlocher et al. |
| 6,431,982 B2 | 8/2002 | Kobayashi |
| 6,454,649 B1 | 9/2002 | Mattice et al. |
| 6,458,032 B1 | 10/2002 | Yamagami |
| 6,506,114 B1 | 1/2003 | Estes et al. |
| 6,508,709 B1 | 1/2003 | Karmarkar |
| 6,512,522 B1 | 1/2003 | Miller et al. |
| 6,515,688 B1 * | 2/2003 | Berry et al. .................... 715/848 |
| 6,517,433 B2 | 2/2003 | Loose et al. |
| 6,524,185 B2 | 2/2003 | Lind |
| 6,533,273 B2 | 3/2003 | Cole et al. |
| 6,537,150 B1 | 3/2003 | Luciano |
| 6,542,168 B2 | 4/2003 | Negishi et al. |
| 6,559,863 B1 | 5/2003 | Megiddo |
| 6,569,017 B2 | 5/2003 | Enzminger et al. |
| 6,570,587 B1 * | 5/2003 | Efrat et al. ..................... 715/723 |
| 6,577,330 B1 * | 6/2003 | Tsuda et al. ................... 715/782 |
| 6,597,358 B2 * | 7/2003 | Miller ........................... 345/427 |
| 6,597,380 B1 | 7/2003 | Wang et al. |
| 6,626,760 B1 | 9/2003 | Miyamoto et al. |
| 6,628,310 B1 | 9/2003 | Hiura et al. |
| 6,641,478 B2 | 11/2003 | Sakai |
| 6,645,070 B2 | 11/2003 | Lupo |
| 6,656,040 B1 | 12/2003 | Brosnan et al. |
| 6,656,044 B1 | 12/2003 | Lewis |
| 6,661,426 B1 * | 12/2003 | Jetha et al. ..................... 345/629 |
| 6,667,741 B1 | 12/2003 | Kataoka et al. |
| 6,700,588 B1 | 3/2004 | MacInnis et al. |
| 6,734,884 B1 * | 5/2004 | Berry et al. .................... 715/848 |
| 6,746,329 B1 | 6/2004 | Duhamel |
| 6,760,050 B1 | 7/2004 | Nakagawa |
| 6,769,982 B1 | 8/2004 | Brosnan |
| 6,772,195 B1 | 8/2004 | Hatleid et al. |
| 6,802,776 B2 | 10/2004 | Lind et al. |
| 6,811,482 B2 | 11/2004 | Letovsky |
| 6,822,662 B1 * | 11/2004 | Cook et al. ..................... 715/788 |
| 6,840,858 B2 | 1/2005 | Adams |
| 6,847,162 B2 | 1/2005 | Duggal et al. |
| 6,866,585 B2 | 3/2005 | Muir |
| 6,887,157 B2 | 5/2005 | LeMay et al. |
| 6,902,481 B2 | 6/2005 | Breckner et al. |
| 6,922,815 B2 * | 7/2005 | Rosen ............................ 715/782 |
| 6,938,218 B1 * | 8/2005 | Rosen ............................ 715/850 |
| 6,942,571 B1 | 9/2005 | McAllister et al. |
| 7,008,324 B1 | 3/2006 | Johnson et al. |
| 7,009,611 B2 | 3/2006 | Di Lelle |
| 7,034,825 B2 * | 4/2006 | Stowe et al. ................... 345/423 |
| 7,070,504 B2 | 7/2006 | Iwamoto |
| 7,179,166 B1 | 2/2007 | Abbott |
| 7,192,345 B2 | 3/2007 | Muir et al. |
| 7,291,068 B2 | 11/2007 | Bryant et al. |
| 7,318,774 B2 | 1/2008 | Bryant et al. |

| | | |
|---|---|---|
| 7,367,885 B2 | 5/2008 | Escalera et al. |
| 7,400,322 B1 | 7/2008 | Urbach |
| 7,465,230 B2 | 12/2008 | LeMay et al. |
| 7,503,003 B2 | 3/2009 | Kamen et al. |
| 7,503,006 B2 | 3/2009 | Danieli |
| 7,572,186 B2 | 8/2009 | Lemay et al. |
| 7,581,195 B2 * | 8/2009 | Sciammarella et al. ...... 715/838 |
| 2001/0054794 A1 | 12/2001 | Cole et al. |
| 2002/0013170 A1 | 1/2002 | Miller |
| 2002/0016201 A1 | 2/2002 | Bennett et al. |
| 2002/0019253 A1 * | 2/2002 | Reitzen et al. .................. 463/16 |
| 2002/0105515 A1 | 8/2002 | Mochizuki |
| 2002/0111208 A1 | 8/2002 | Marta |
| 2002/0111212 A1 | 8/2002 | Muir |
| 2002/0113369 A1 | 8/2002 | Weingardt |
| 2002/0113820 A1 * | 8/2002 | Robinson et al. ............. 345/764 |
| 2002/0132661 A1 | 9/2002 | Lind |
| 2002/0175466 A1 | 11/2002 | Loose et al. |
| 2003/0013517 A1 | 1/2003 | Bennett et al. |
| 2003/0032479 A1 | 2/2003 | LeMay et al. |
| 2003/0045345 A1 | 3/2003 | Berman |
| 2003/0064781 A1 | 4/2003 | Muir |
| 2003/0064801 A1 | 4/2003 | Breckner |
| 2003/0119581 A1 | 6/2003 | Cannon et al. |
| 2003/0125101 A1 | 7/2003 | Campo |
| 2004/0002380 A1 | 1/2004 | Brosnan |
| 2004/0029636 A1 | 2/2004 | Wells |
| 2004/0048657 A1 | 3/2004 | Gauselmann |
| 2004/0077402 A1 | 4/2004 | Schlottmann |
| 2004/0077404 A1 | 4/2004 | Schlottmann et al. |
| 2004/0092302 A1 | 5/2004 | Gauselmann |
| 2004/0102244 A1 | 5/2004 | Kryuchkov et al. |
| 2004/0102245 A1 | 5/2004 | Escalera et al. |
| 2004/0198485 A1 | 10/2004 | Loose et al. |
| 2004/0266515 A1 | 12/2004 | Gauselmann |
| 2005/0001845 A1 | 1/2005 | Noyle |
| 2005/0075167 A1 | 4/2005 | Beaulieu et al. |
| 2005/0225559 A1 * | 10/2005 | Robertson et al. ............ 345/581 |
| 2005/0233798 A1 | 10/2005 | Van Asdale |
| 2005/0233799 A1 | 10/2005 | LeMay et al. |
| 2006/0025199 A1 | 2/2006 | Harkins et al. |
| 2006/0229122 A1 | 10/2006 | Macke |
| 2006/0287058 A1 | 12/2006 | Resnick et al. |
| 2007/0155471 A1 | 7/2007 | Powell et al. |
| 2007/0155472 A1 | 7/2007 | Gail et al. |
| 2007/0155473 A1 | 7/2007 | Powell et al. |
| 2007/0161423 A1 | 7/2007 | Bienvenue et al. |
| 2008/0045331 A1 | 2/2008 | LeMay et al. |
| 2008/0188303 A1 | 8/2008 | Schlottman et al. |
| 2008/0188304 A1 | 8/2008 | Escalera et al. |
| 2008/0303746 A1 | 12/2008 | Schlottman et al. |

FOREIGN PATENT DOCUMENTS

| | | |
|---|---|---|
| AU | 200210214 | 8/2002 |
| AU | 200227720 | 2/2003 |
| AU | 2003237479 B2 | 1/2004 |
| AU | 2006203556 B2 | 9/2006 |
| CA | 2 343 870 | 10/2001 |
| EP | 0475581 | 3/1992 |
| EP | 0759315 | 2/1997 |
| EP | 0 830 881 | 3/1998 |
| GB | 2405107 | 2/2005 |
| GB | 2412282 | 9/2005 |
| GB | 2420294 | 5/2006 |
| GB | 2459628 | 11/2009 |
| GR | 62140 B | 8/1979 |
| JP | 2002-099926 (A) | 4/2002 |
| RU | 2 067 775 C1 | 10/1996 |
| RU | 2 168 192 C2 | 5/2001 |
| WO | WO 98/45004 | 10/1998 |
| WO | WO 02/32521 | 4/2002 |
| WO | WO 02/073501 | 9/2002 |
| WO | WO 2004/002591 | 1/2004 |
| WO | WO 2004/028650 | 4/2004 |
| WO | WO 2004/029893 | 4/2004 |
| WO | WO 2005/016473 | 2/2005 |
| WO | WO 2005/034054 | 4/2005 |
| WO | WO 2006/039324 | 4/2006 |
| WO | WO 2008/005278 | 1/2008 |
| WO | WO 2008/154433 | 12/2008 |

OTHER PUBLICATIONS

U.S. Office Action dated Jun. 24, 2008 from related U.S. Appl. No. 10/803,233, 15 pgs.

Notice of Allowance and Allowed Claims dated Sep. 9, 2008 from U.S. Appl. No. 11/829,807.

Notice of Allowance and Allowed Claims dated Sep. 15, 2008 from U.S. Appl. No. 11/112,076.

Australian Office Action dated Jun. 26, 2008 from AU Application No. 2006203556.

Microsoft Press Computer Dicitonary Third Edition Redmond, WA 1997 p. 406.

Carson G. S.: "Standards Pipeline The OpenGL Specification" Computer Graphics, ACM, US, vol. 31, No. 2, May 1997, pp. 17-18, XP000969297, ISSN: 097-8930.

Mason Woo, Jackie Neider, Tom Davis, Dave Shreiner, OpenGL Program Guide: The Official Guide to Learning OpenGL, Introduction to OpenGL Chapter 1, Version 1.2, 3.sup.rd edition, Open GL Architecture Review Board, Addison-Wesley Publishing, Co., 1999, ISBN: 0201604582.

Power VR (PowerVR), 3D Graphical Processing, Nov. 14, 2000, Copyright Power VR 2000.

M2 Presswire, Aristocrat Technologies to use PowerVR Technology in Casino Video Machines; Australian Company Leads Market for Video Machine Games of Chance, Oct. 17, 2000, http://www.aristocrat.com.au/PR181000.htm, Copyright 2000 M2 Communications Ltd.

David Einstein, 3D Web Browsing on the Horizon, Nov. 27, 2000, http://www.forbes.com/2001/11/27/1127thread.html., Forbes.com.

European Office Action dated Nov. 24, 2005 from related EP Application No. 03770604.1 4 pages.

International Search Report dated Jun. 23, 2005 from related UK Application No. 0505328.5.

U.S. Office Action dated Jun. 12, 2007 from related U.S. Appl. No. 10/674,884.

GameSpot Staff. "15 Most Influential Games of All Time" Gamespot [online], retrieved May 30, 2007]. Retrieved from the Internet <http://web.archive.org/web/20010618175937/http://gamespot.com/gamespot/features/pc/most_influential/p16.html>.

U.S. Office Action dated Sep. 6, 2007 from related U.S. Appl. No. 10/803,233.

U.S. Office Action dated Feb. 12, 2007 from related U.S. Appl. No. 10/676,719.

Notice of Allowance dated Sep. 24, 2007 from related U.S. Appl. No. 10/676,719 and Allowed Claims.

European Office Action dated Jun. 29, 2007 from related EP Application No. 03773084.3 3 pages.

Russian Office Action dated Jul. 19, 2007 from related Russian Application No. 2005109160 9 pages.

Russian Office Action dated Jul. 19, 2007 from related Russian Application No. 2005109161 7 pages.

U.S. Office Action dated Dec. 10, 2007 from related U.S. Appl. No. 11/112,076 14 pages.

U.S. Office Action dated Dec. 12, 2007 from related U.S. Appl. No. 11/829,807 15 pages.

U.S. Office Action dated Feb. 20, 2008 from related U.S. Appl. No. 10/674,884 7 pages.

International Search Report and Written Opinion dated Feb. 12, 2008 from related PCT Application No. PCT/US2007/015015 15 pages.

Supplemental Information Disclosure Statement dated Jan. 28, 2004 from related U.S. Appl. No. 10/272,788 4 pages.

"3D Modelers Are Running under Linux" LinuxFocus: vol. Nr 4, May 1998 http://mercury.chem.pitt.edu/~tiho/ LinuxFocus/English/May1998/index.html printed on Oct. 11, 2002.

Phillip Ross, "Hardware Review: 3Dfx Graphics Card" LinuxFocus vol. 2, pp. 1-7 http://mercury.chem.pitt.edu/~tiho/ LinuxFocus/English/January1998/artilce18.ht printed on Oct. 11, 2002.

"Learn How to Program 3D Graphics" LinuxFocus vol. NR 2, Jan. 1998 1-2 pages http://mercury.chem.pitt.edu/~tiho/LinuxFocus/English/January1998/index/html.

Miguel Angel Sepulveda, "Open GL Programming: The 3D Scene" pp. 1-7 http://mercury.chem.pitt.edu/~tiho/ LinuxFocus/English/May1998/article46.html.

Miguel Angel Sepulveda, "What is OpenGL?" LinuxFocus vol. 2 pp. 1-5 http://mercury.chem.pitt.edu/~tiho/ LinuxFocus/English/January1998/article15.html printed on Oct. 11, 2002.

"TE 5 Graphics Accelerator Technology Preview" NEC Aug. 2001, 7 pages.

"A Primer form Mercury Research The Basics of 3D Graphics Technology" The Meter available at http://www.themeter.com/artilces/3DBasics.shtml printed on Jan. 31, 2003 pp. 1-2.

"The Basics of 3D: Tackling the Pipeline", The Meter, available at http://www.themeter.com/articles/3DBasics-2.shtml, printed on Jan. 31, 2003 pp. 1-2.

"The Basics of 3D: Balancing the Pipeline", the Meter, available at http://www.themeter.com/articles/3DBasics-3.shtml, printed on Jan. 31, 2003 pp. 1-2.

"The Basics of 3D: Adding Parallelism", The Meter, available at http://www.themeter.com/articles/3DBasics-4.shtml, printed on Jan. 31, 2003 pp. 1-2.

"The Basics of 3D: What's Next", The Meter, available at http://www.themeter.com/articles/3DBasics-5.shtml, printed on Jan. 31, 2003 p. 1.

"The Basics of 3D: Transform and Lighting", The Meter, available at http://www.themeter.com/articles/3DBasics-6.shtml, printed on Jan. 31, 2003 pp. 1-2.

"The Basics of 3D: The Next Generation", The Meter, available at http://www.themeter.com/articles/3DBasics-7.shtml, printed on Jan. 31, 2003 pp. 1-2.

Scott et al. "An Overview of the VISUALIZE fx Graphics Accelerator Hardware" Article 4 Hewlet Packard Company May 1998, HP Journal.

"Pattern Display Device," Patent Abstracts of Japan, Publication No. 2002-085624, published Mar. 26, 2002.

"Game Machine," Patent Abstracts of Japan, Publication No. 2001-252394, published Sep. 18, 2001.

"Game Machine," Patent Abstracts of Japan, Publication No. 2001-252393, published Sep. 18, 2001.

"Slot Machine," Patent Abstracts of Japan, Publication No. 2001-062032, published Mar. 13, 2001.

Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (29 pages).

Rose, "Nevada A.G. Finds Free Internet Gambling is Still Gambling", Mar. 2001, printed from http://rose.casinocitytimes.com/articles/974.html, pp. 1-4.

U.S. Office dated Feb. 8, 2005 from related U.S. Appl. No. 10/272,788, 11 pages.

U.S. Office dated May 25, 2005 from related U.S. Appl. No. 10/272,788, 14 pages.

U.S. Office dated Jun. 1, 2006 from related U.S. Appl. No. 10/272,788, 10 pages.

U.S. Office dated Oct. 26, 2006 from related U.S. Appl. No. 10/272,788, 8 pages.

Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (40 pages).

Bienvenue et al., U.S. Appl. No. 11/312,966, "Bingo System with Downloadable Common Patterns", filed Dec. 19, 2005.

Powell et al., U.S. Appl. No. 11/312,948, "Bingo Gaming Machine Capable of Seclecting Different Bingo Pools", filed Dec. 19, 2005.

Gail et al., U.S. Appl. No. 11/402,726, "Using Multiple Bingo Cards to Represent Multiple Slot Paylines and Other Class III Game Options", filed Apr. 11, 2006.

Powell et al., U.S. Appl. No. 11/442,029, "Bingo System with Discrete Payout Categories", filed May 26, 2006.

England and Wales High Court (Patent Court) Decisions; Neutral Citation Number: [2005] EWHC 2416 (Pat) Case No. CH/2005/APP/0232 http://www.bailii.org/we/cases/EWHC/Patents/2005/2416.html (5 pgs.).

Patents Act 1977: Examining for Patentability Article http://www.patent.gov.uk/patent/notices/practice/examforpat.htm (3 pgs.).

Scarne, John., Scarne on Cards, 1949, Crown Publishers, p. 243.

"PowerVR Technologies Debuts KYRO II SE Graphics Proecssor at CeBIT 2002", Tech/Zone, Mar. 13, 2002, available at http://www.techzone.p.cvsconsole.com/news.php?tzd=1246.

Office Action dated Jan. 23, 2009 from U.S. Appl. No. 10/803,233 [P083].

Final Office Action dated Oct. 1, 2009 from U.S. Appl. No. 10/803,233 [P083].

Notice of Allowance dated Jan. 27, 2010 from related U.S. Appl. No. 10/803,233.

Notice of Allowance dated Mar. 11, 2010 from related U.S. Appl. No. 10/803,233.

U.S. Office Action dated Jun. 17, 2005 from U.S. Appl. No. 10/187,343 [P067].

Final Office Action dated Jan. 30, 2007 from U.S. Appl. No. 10/187,343 [P067].

U.S. Office Action dated Jun. 27, 2007 from U.S. Appl. No. 10/187,343 [P067].

Office Action dated Aug. 21, 2008 from U.S. Appl. No. 10/187,343 [P067].

Office Action dated May 15, 2009 from U.S. Appl. No. 10/187,343 [P067].

Final Office Action dated May 10, 2010 from U.S. Appl. No. 10/187,343.

U.S. Office Action dated May 18, 2010 from related U.S. Appl. No. 12/101,921.

Office Action dated Nov. 5, 2008 from U.S. Appl. No. 12/024,931 [P542C1].

Office Action dated Dec. 31, 2009 from U.S. Appl. No. 12/024,931 [P542C1].

Final Office Action dated Jun. 9, 2009 from U.S. Appl. No. 12/024,931 [P542C1].

Australian Examination Report mailed Jun. 18, 2008 in Application No. 2003237479 [P067AU].

Australian Examination Report dated Feb. 6, 2009 from Application No. 2003279742. [P086AU].

Australian Examination Report dated Feb. 16, 2009 from Application No. 2003279092. [P085AU].

Australian Examination Report dated Mar. 12, 2010 from Application No. 2005201148.

British Examination Report dated Nov. 7, 2006 from Application No. 0427512.9 [P067GB].

British Examination Report dated May 14, 2009 from Application No. GB0505328.5. [P083GB].

British Examination Report dated Dec. 9, 2009 from Application No. GB0505328.5.

British Examination Report dated Jun. 9, 2005 from UK Application No. 0427512.9, 2 pgs. [P067GB].

European Examination Report dated Jun. 3, 2009 from Application No. 07809991.8 [P053C1X1EP].

International Search and Examination Report dated Mar. 16, 2006 from UK Application No. 0600005.3, 5 pgs. [P067GBD1 ].

International Search Report dated Mar. 1, 2004 from related PCT Application No. PCT/US2003/031138 [P085WO].

International Search Report dated Jan. 13, 2004 from related PCT Application No. PCT/US2003/018028 [P067WO].

International Search Report dated Mar. 19, 2004 from related PCT Application No. PCT/US2003/031158 [P086WO].

International Preliminary Report on Patentability dated Dec. 7, 2009 from related PCT Application No. PCT/US2008/066196 [P271WO].

International Search Report and Written Opinion dated Oct. 24, 2008 from related PCT Application No. PCT/US2008/066196 [P0271WO].

U.S. Office Action dated Jun. 13, 2003 issued in U.S. Appl. No. 09/927,901.

U.S. Final Office Action dated Dec. 22, 2003 issued in U.S. Appl. No. 09/927,901.

U.S. Examiner Interview Summary dated Mar. 16, 2004 issued in U.S. Appl. No. 09/927,901.

U.S. Office Action dated Jun. 21, 2004 issued in U.S. Appl. No. 09/927,901.

U.S. Examiner Interview Summary dated Jul. 27, 2004 issued in U.S. Appl. No. 09/927,901.

U.S. Notice of Allowance dated Dec. 16, 2004 issued in U.S. Appl. No. 09/927,901.

U.S. Office Action dated Aug. 18, 2010 issued in U.S. Appl. No. 11/481,666.

U.S. Notice of Allowance dated Aug. 6, 2010 issued in U.S. Appl. No. 10/187,343.

U.S. Notice of Allowance dated Jul. 12, 2010 issued in U.S. Appl. No. 10/803,233.

U.S. Action—Examiner's Answer re Brief on Appeal, dated Jun. 22, 2009 issued in U.S. Appl. No. 10/674,884.

U.S. Action—Examiner's Communication re IDS Considered dated Jul. 27, 2009 issued in U.S. Appl. No. 10/674,884.

U.S. Office Action dated Aug. 25, 2010 issued in U.S. Appl. No. 11/759,825.

U.S. Notice of Non-Compliant Amendment (37 CFR 1.121) dated Aug. 11, 2010 issued in U.S. Appl. No. 12/024,931.

U.S. Notice of Allowance dated Sep. 20, 2010 issued in U.S. Appl. No. 12/024,931.

Australian Examiner's first report dated Nov. 21, 2005 issued in AU Patent Application No. 27720/02.

PCT International Preliminary Report on Patentability and Written Opinion dated Jan. 6, 2009 issued in PCT Application No. PCT/US2007/015015.

EP Result of Consultation dated Sep. 1, 2009 issued in Application No. 07 809 991.8-2221.

Australian Examiner's Report No. 2 dated Aug. 10, 2010 issued in Application No. 2005201148.

European Examination Report dated Dec. 15, 2005 issued in EP Application No. 03 773 084.3-2218.

U.S. Notice of Allowance dated Nov. 30, 2010 issued in U.S. Appl. No. 10/187,343.

U.S. Notice of Allowance and Examiners Communication dated Nov. 3, 2010 issued in U.S. Appl. No. 10/803,233.

U.S. Office Action Final dated Oct. 29, 2010 issued in U.S. Appl. No. 12/101,921.

U.S. Notice of Allowance dated Nov. 15, 2010 issued in U.S. Appl. No. 12/024,931.

* cited by examiner

VIRTUAL CAMERAS AND 3-D GAMING ENVIRONMENTS IN A GAMING MACHINE

CROSS-REFERENCES TO RELATED APPLICATIONS

This application is a divisional of U.S. patent application Ser. No. 11/112,076, entitled "VIRTUAL CAMERAS AND 3-D GAMING ENVIRONMENTS IN A GAMING MACHINE" and filed Apr. 22, 2005, which is a continuation of U.S. patent application Ser. No. 09/927,901, entitled "VIRTUAL CAMERAS AND 3-D GAMING ENVIRONMENTS IN A GAMING MACHINE" and filed Aug. 9, 2001 (now issued as U.S. Pat. No. 6,887,157), both of which are hereby incorporated by reference.

BACKGROUND OF THE INVENTION

This invention relates to game presentation methods for gaming machines such as slot machines and video poker machines. More particularly, the present invention relates to apparatus and methods of for displaying game presentations derived from a 3-D gaming environment.

As technology in the gaming industry progresses, the traditional mechanically driven reel slot machines are being replaced with electronic counterparts having CRT, LCD video displays or the like. These video/electronic gaming advancements enable the operation of more complex games, which would not otherwise be possible on mechanical-driven gaming machines. Gaming machines such as video slot machines and video poker machines are becoming increasingly popular. Part of the reason for their increased popularity is the nearly endless variety of games that can be implemented on gaming machines utilizing advanced electronic technology.

There are a wide variety of associated devices that can be connected to video gaming machines such as video slot machines and video poker machines. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the players interest in additional game play. Maintaining a game player's interest in game play, such as on a gaming machine or during other gaming activities, is an important consideration for an operator of a gaming establishment.

One method for maintaining a player's interest is to present multiple games at the same time during a game presentation. For instance, triple play poker in which a player plays three hands of poker during each game presentation has become very popular game implemented on a video gaming machine. Variants of triple play poker include game presentations where a hundred or more poker hands are played during each game presentation. The presentation of multiple games during a single game presentation may be extended to other types of games, such as video slot games.

One difficulty associated with presenting multiple games in a video game presentation is the screen resolution of the display on a gaming machine. A typical display resolution on a gaming machine is about 640 pixels by 480 pixels. As the number of games presented in a game presentation increases, the amount of detail may be limited by the screen resolution. For instance, for a hundred hand poker game where a hundred poker hands are displayed during each game presentation, each card must be drawn fairly small without much detail to accommodate all of the cards on a single display screen. The lack of detail and small card size may discourage some game players from playing such games.

Another method for maintaining a player's interest in playing a game on a gaming machine is to present an exciting game presentation that is shown on a display screen on the gaming machine. Many newer game systems use graphical generation schemes employing mass storage devices that utilize varied load times and stream-able media formats to generate an exciting game presentation. With these game systems, many game scenes are generated during the game play using complex renderings and video playback capabilities. Typically, however, for efficiency reasons, a player has little control over the game outcome presentation other than through game decisions they make during the play of the game.

In view of the above, it would be desirable to provide method and apparatus that allow detailed game presentations accommodating the simultaneous play of multiple games to be presented on a video gaming machine where the game presentation may also be controlled by a game player.

SUMMARY OF THE INVENTION

This invention addresses the needs indicated above by providing method and apparatus on a gaming machine for presenting a plurality of game outcome presentations derived from one or more virtual 3-D gaming environments stored on the gaming machine. While a game of chance is being played on the gaming machine, two-dimensional images derived from a 3-D object in the 3-D gaming environment may be rendered to a display screen on the gaming machine in real-time as part of a game outcome presentation. To add excitement to the game, the 3-D position of the 3-D object and other features of the 3-D gaming environment may be controlled by a game player. Nearly an unlimited variety of virtual objects, such as slot reels, gaming machines and casinos, may be modeled in the 3-D gaming environment.

One aspect of the present invention provides a method of playing a game of chance in a gaming machine including a master gaming controller, a display device and a memory device. The method may be generally characterized as including: 1) receiving a wager for one or more games of chance controlled by the master gaming controller on the gaming machine; 2) determining game outcomes for each of the one or more games of chance; 3) rendering one or more two-dimensional images derived from a 3-D object in a three-dimensional gaming environment stored in the memory device on the gaming machine; and 4) displaying the one or more rendered two-dimensional images to the display device on the gaming machine. The game of chance may be selected from the group consisting of a slot game, a keno game, a poker game, a pachinko game, a video black jack game, a bingo game and a card game.

The 3-D gaming environment may comprise one or more 3-D object models where each 3-D object model is defined by a plurality of surface elements. A 3-D object model of a slot reel, a 3-D object model of a gaming machine and a 3-D object model of a casino are examples of 3-D object models which may be defined in a gaming environment. The position of the 3-D object models in the gaming environment may vary with time.

In particular embodiments, the method may include rendering in the 3-D gaming environment of one or more of the following items: i) a game outcome presentation for at least one of the games of chance, ii) a gaming machine maintenance operation, iii) a gaming machine operational feature, iv) an attract mode feature, v) a promotional feature, vi) casino information and vii) a bonus game presentation and capturing one or more of these items on the one or more two-dimensional images. The gaming machine operational feature may be selected from the group consisting of inserting a player tracking card in a card reader on the gaming machine, entering an identification code on the gaming machine, pressing an input button on the gaming machine, inserting a printed ticket in a bill validator on the gaming machine.

In other embodiments, a three-dimensional position of the 3-D object and a rate of movement of the 3-D object may be time varying. In addition, the three-dimensional position of the 3-D object may change at least one of continuously, non-continuously and combinations thereof. Also, the method may include receiving an input signal to change the three-dimensional position of the 3-D object where the three-dimensional position of the 3-D object is changed to enlarge a feature in the 3-D gaming environment displayed on the display device.

In yet other embodiments, the method may include one or more of a) displaying simultaneously a portion of a rendered two-dimensional image on a first display device on the gaming machine and the portion of the rendered two-dimensional image on a second display device on the gaming machine, b) displaying simultaneously a first portion of a rendered two-dimensional image on a first display device on the gaming machine and a second portion of the rendered two-dimensional image on a second display device on the gaming machine and c) displaying simultaneously a rendered two-dimensional image on a display device on a first gaming machine and the rendered two-dimensional image on a display device on a second gaming machine.

The method may also include one or more of 1) receiving an input signal to initiate one or more games of chance, 2) receiving a wager for a first game and receiving a wager for a second game; and rendering a game outcome presentation for the first game and the second game in the gaming environment, 3) receiving one or more input signals containing information used to play the game of chance and 4) receiving one or more input signals containing information used to select a 3-D gaming environment for the game of chance.

Another aspect of the present invention provides a method of generating a game of chance played on a gaming machine. The method may be generally characterized as including: 1) selecting one or more game events in a game of chance that are represented visually on the gaming machine; 2) generating a visual storyboard for each game event; 3) generating one or more 3-D gaming environments designed or configured to present the visual storyboard for each game event; 4) filming each visual storyboard in the one or more 3-D gaming environments using a virtual camera; and 5) rendering a sequence of 2-D images derived from 3-D objects in the one or more 3-D gaming environments where a 3-D position of each 3-D object in the sequence of 2-D images is defined by a position of virtual camera in the one or more 3-D gaming environment. A sequence of positions of the virtual camera in the one or more 3-D gaming environments used to film the visual storyboard may be pre-selected or the sequence of positions of the virtual camera may be controlled by a player operating the gaming machine. The sequence of 2-D images filmed in the one or more gaming environments may be displayed on a display device on the gaming machine.

Another aspect of the present invention provides a gaming machine. The gaming machine may be characterized as including: 1) a master gaming controller designed or configured to control one or more games of chance played on the gaming machine; 2) one or more virtual three-dimensional (3-D) gaming environments available for rendering a game outcome presentation for the one or more games of chance; 3) game logic designed for rendering one or more two-dimensional images derived from a 3-D object in at least one of the 3-D gaming environments and, 4) one or more display devices for displaying the game outcome presentations using the one or more two-dimensional images. The game of chance may be selected from the group consisting of a slot game, a keno game, a poker game, a pachinko game, a video black jack game, a bingo game and a card game.

In particular embodiments, the game logic may be designed or configured to draw in the gaming environment one or more of the following items i) a plurality of the game outcome presentations, ii) a gaming machine maintenance operation, a gaming machine operational feature, iii) an attract mode feature, iv) a promotional feature, v) casino information and vi) a bonus game presentation. These items may be captured on the one or more rendered two-dimensional images.

The gaming machine may include an input mechanism, such as a key pad, a touch screen, a mouse, a joy stick, a microphone and a track ball, designed or configured to receive an input signal used to change a three-dimensional position of the 3-D object. The three-dimensional position of the 3-D object may be changed to enlarge a feature in the 3-D gaming environment displayed on the one or more display devices. The gaming machine may also include 1) an input mechanism designed or configured to receive one or more input signals containing information used to select a 3-D gaming environment for the game outcome presentation of a game of chance, 2) a geometry processing unit, separate from the master gaming controller, designed or configured to execute the game logic for rendering one or more two-dimensional images derived from the 3-D object and 3) a network interface board designed or configured to allow the master gaming controller to communicate with a remote display device where the rendered one or more two-dimensional images are displayed on the remote display device. The master gaming controller may communicate with the remote display device using at least one of a local area network, a wide area network or the Internet.

Another aspect of the present invention provides a method of playing a plurality games of chance in a gaming machine with a master gaming controller, a display device and a memory device. The method may be generally characterized as including: 1) receiving a single wager for a plurality of games of chance controlled by the master gaming controller on the gaming machine; 2) determining a game outcome for each game of chance in the plurality games of chance; 3) rendering the plurality of games of chance in a three dimensional gaming environment stored in the memory device on the gaming machine; 4) rendering a first two-dimensional image derived from a first 3-D object in the three-dimensional gaming environment wherein the first two-dimensional image comprises a first portion of the plurality of rendered games of chance; 5) displaying the first rendered two-dimensional image to the display device on the gaming machine; 6) rendering a second two-dimensional image derived from a second 3-D object in the three-dimensional gaming environment wherein the second two-dimensional image comprises a second portion of the rendered plurality of games of chance; and 7) displaying the second rendered two-dimensional image to the display device on the gaming machine.

The method may also include one or more of the following: a) receiving a wager for each of the plurality of games of chance, b) rendering a sequence of two-dimensional images derived from 3-D objects in the three-dimensional gaming environment wherein three-dimensional positions of the 3-D objects in the sequence appear to vary continuously between a first three-dimensional position of a first 3-D object and a second three-dimensional position of a second 3-D object, c) selecting a first game of chance in the first portion of the plurality of rendered games of chance; making a wager on the first game of chance; initiating the first game of chance; selecting a second game of chance in the second portion of the plurality of rendered games of chance; making a wager on the second game of chance; and initiating the second game of chance, d) receiving an input signal to initiate at least one game of chance in the first portion of the plurality of rendered games of chance; and rendering a game outcome presentation for the at least one game of chance, e) rendering a bonus game for the at least one game of chance, f) receiving an input signal to initiate at least one game of chance in the second portion of the plurality of rendered games of chance; and rendering a game outcome presentation for the at least one game of chance, g) rendering a bonus game for the at least one game of chance.

In particular embodiments, the plurality of games of chance are multiple hands of a card game presented simultaneously where the multiple hands of the card game are between 1 hand of poker to 1000 hands of poker. Further, the game of chance may be selected from the group consisting of a slot game, a keno game, a poker game, a pachinko game, a video black jack game, a bingo game and a card game.

In a gaming machine comprising a master gaming controller, a display device and a memory device, a method of displaying a plurality game windows on the display device wherein at least one of the game windows is used to present a game of chance. The method may be described as including: 1) generating a plurality of 3-D game windows arranged in a 3-D game interface model wherein the 3-D game interface model comprises a 3-D geometric surface description for each of the plurality of game windows; 2) mapping game window content to each of the 3-D game windows, 3) rendering game window content to each of the 3-D game windows; 4) rendering a two-dimensional image derived from a three-dimensional object in the three-dimensional game interface model stored in the memory device on the gaming machine; and 5) displaying the rendered two-dimensional image to the display device on the gaming machine.

The method may also include one or more of the following: a) activating the one or more 3-D game windows, b) receiving an input signal to initiate a game of chance in one or more of the active 3-D game windows, c) rotating the 3-D game interface model, d) presenting a game of chance in one or more of the game windows, e) rendering first game window content in a first 3-D game window; rendering second game window content in a second 3-D game window; rendering the first game window content in the second 3-D game window; and rendering the second game window content in the first 3-D game window and f) rendering a two-dimensional image derived from a 3-D object in a three-dimensional gaming environment stored in the memory device on the gaming machine to a 3-D game window in the 3-D game interface model.

In the particular embodiments, the game window content may be selected from the group consisting of a game of chance, a bonus game, an advertisement, news, stock quotes, electronic mail, a web page, a message service, a locator service or a hotel/casino service, a movie, a musical selection, a casino promotion, a broadcast event, a maintenance operation, a player tracking service, a drink menu and a snack menu. The game of chance may be selected from the group consisting of a slot game, a keno game, a poker game, a pachinko game, a video black jack game, a bingo game and a card game. At least one game window may be used to play a game against another game player. Further, at least one game window may be used to share a bonus game with a group of game players.

Another aspect of the present invention provides a method a method of displaying game information in a game window in a gaming machine with a master gaming controller, a display device and a memory device. The method may be generally characterized as including: 1) generating a game window with a first size; 2) rendering a first two-dimensional image derived from a three-dimensional object in a three-dimensional gaming environment stored in the memory device on the gaming machine to fit within the first size of the game window; 3) displaying on the display device the rendered first two-dimensional image within the game window; 4) changing the game window to a second size; 5) rendering a second two-dimensional image derived from the 3-D object in the three-dimensional gaming environment stored in the memory device on the gaming machine to fit within the second size of the game window; and 6) displaying on the display device the rendered second two-dimensional image within the game window wherein the game information is used to play a game of chance on the gaming machine.

In particular embodiments, the method may also include on or more of the following: a) wherein the second size of the game window is smaller than the first size of the game window; generating one or more new game windows in a game window area around the game wherein the game window area is a difference in area between an area of the first size of the game window and an area of the second size of the game window; and displaying game information in the one or more new game windows, b) removing the new one or more new game windows; and returning the game window to the first size and c) rendering a sequence second two-dimensional images derived 3-D objects in the three-dimensional gaming environment stored in the memory device on the gaming machine where each two-dimensional image in the sequence is sized to fit within a sequence of game windows between the first size and the second size.

Another aspect of the present invention provides a method of activating an input button modeled in a 3-D gaming environment in a gaming machine with a master gaming controller, a display device and a memory device. The method may be generally characterized as including: 1) generating one or more 3-D models of input buttons in a 3-D gaming environment used to play a game of chance on the gaming machine; 2) rendering a two-dimensional image derived from a three-dimensional object in a three-dimensional gaming environment stored in the memory device on the gaming machine wherein the three-dimensional object comprises at least a portion of one or more the input buttons modeled in the 3-D gaming environment; 3) displaying the rendered two-dimensional image to the display device on the gaming machine; 4) receiving an input signal including at least an input location corresponding to a location on the display device displaying the rendered two-dimensional image; 5) generating an input line in the 3-D gaming environment using the input location; and 6) detecting a collision between the input line and at least one of an input button modeled in the 3-D gaming environment.

The method may also include one or more of the following: a) comparing 3-D coordinates of the input line in the gaming environment to 3-D coordinates of input buttons modeled in the 3-D gaming environment, b) performing an action specified by an input button corresponding to the received input location, c) activating one or more input buttons modeled in the 3-D gaming environment, d) ignoring a detected collision between the input line and an input button, when the input button is not activated. In particular embodiments, the input signal may be generated from a touch screen and the input location on the display device corresponds to a cursor location on the display device.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 1:
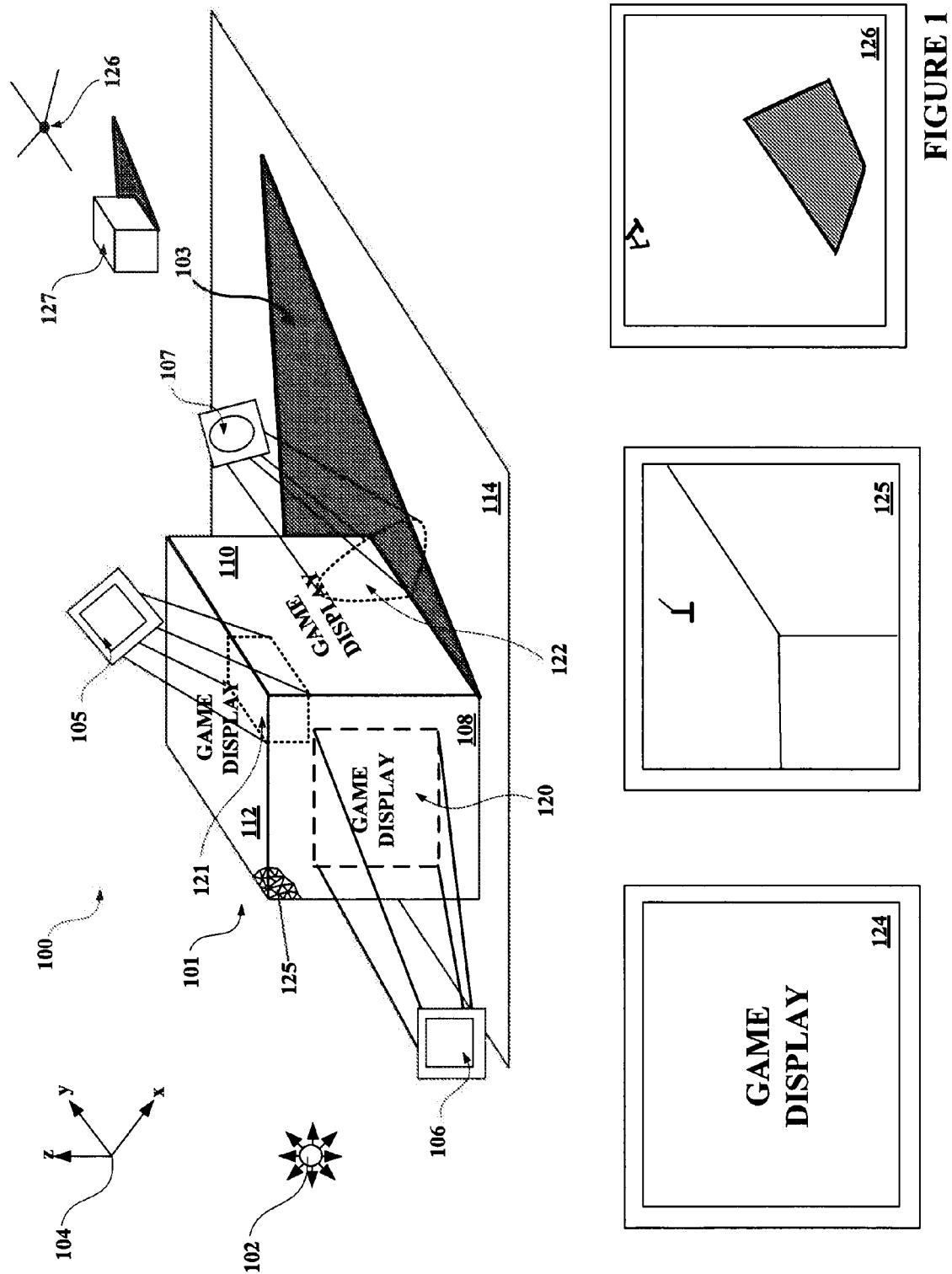
FIG. 1 is a perspective drawing of a 3-D virtual gaming environment implemented on a gaming machine for one embodiment of this invention.

FIG. 1 is a perspective drawing of a 3-D virtual gaming environment 100 implemented on a gaming machine for one embodiment of this invention. The 3-D virtual gaming environment may be used by the master gaming controller on the gaming machine to present a game of chance. The game of chance played on the gaming machine may include: 1) a wager selected by a player playing a game on the gaming machine, 2) an initiation of the game of chance on the gaming machine by the player, 3) a determination of an outcome for the game of chance by the gaming machine and 4) a presentation on the gaming machine of the game outcome to the player. In the present invention, the 3-D gaming environment may be used to present a game outcome to the player, describe operating functions of the gaming machine and provide an interface for obtaining gaming information and services. Apparatus and methods implementing these features are described with respect to FIGS. 1-12.

To utilize a virtual 3-D gaming environment for a game presentation or other gaming activities on a gaming machine, a 2-D view of the virtual 3-D gaming environment is rendered. The 2-D view captures some portion of the surfaces modeled in the virtual 3-D gaming environment. The captured surfaces define a 3-D object in the 3-D gaming environment. The captured surfaces in 2-D view are defined in the 3-dimensional coordinates of the virtual 3-D gaming environment and converted to a 2-dimensional coordinate system during the capturing process. As part of a game presentation, the 2-D view may be presented as a video frame on a display screen on the gaming machine. In some ways, the two-dimensional view is analogous to a photograph of a physical 3-D environment taken by a camera where the photograph captures a portion of the physical 3-D surfaces existing in the physical 3-D environment. However, the photograph from a camera is not strictly analogous to a 2-D view rendered from a virtual 3-D gaming environment because many graphical manipulation techniques may be applied in a virtual 3-D gaming environment that are not available with an actual camera.

In the present invention, the 2-D view is generated from a viewpoint within the virtual 3-D gaming environment. The viewpoint is a main factor in determining what surfaces of the 3-D gaming environment defining a 3-D object are captured in the 2-D view. Since information about the 3-D gaming environment is stored on the gaming machine, the viewpoint may be altered to generate new 2-D views of objects within the 3-D gaming environment. For instance, in one frame, a 2-D view of an object modeled in the 3-D gaming environment, such as a front side of a building (e.g. the viewpoint captures the front side of a building), may be generated using a first viewpoint. In another frame, a 2-D view of the same object may be generated from another viewpoint (e.g. the backside of the building).

A disadvantage of current gaming machines is that the 2-D views used as video frames in game presentations are only rendered from 2-D objects and information about the multi-dimensional nature of the objects rendered in the 2-D views, such as the viewpoint used to generate the 2-D view, are not stored on the gaming machine. Historically, due to the regulatory environment of the gaming industry, gaming software used to present a game of chance has been designed to "run in place" on an EPROM installed on the gaming machine. Using an EPROM, it was not feasible to store large amounts of game data relating to a complicated 3-D model. Thus, only 2-D object information used to render the 2-D view was stored on the gaming machine.

However, 2-D games rendered on gaming machines have also become more sophisticated and often employ complex animations. When complicated animations are used in a 2-D system, such as playing movies on a 2-D object, a 3-D system can actually can save memory because more types of animation can be used with a 3-D system versus a 2-D system without resorting to using movies which are memory intensive. In a 2-D system without using movies, the animation properties that may be used are simple two-dimensional movement and color cycling using color palettes which provide a limited visual appeal.

When only 2-D information about a 3-D object is available, it is not possible to generate new 2-D views from different viewpoints of the 3-D object. For instance, when a picture of a playing card is rendered on current gaming machines, 3-D information, such as the thickness of the card is not stored. Thus, it is not possible to generate a 2-D view of the playing card from an edge-on viewpoint, because the thickness of the card is not known. As another example, frames from a movie may be used as part of a game presentation on a gaming machine. Each frame of the movie represents a 2-D view from a viewpoint of a camera used to film each frame. If the frame included a picture of a building viewed from the front (e.g., the viewpoint captures the front of the building), it is not possible to generate a new 2-D view of the back of the building using because information regarding the back of the building is not known.

One advantage of the present invention is the potential game playing area used to present a game of chance modeled in a 3-D gaming environment is greater than the potential game playing area of a 2-D gaming environment. For instance, a game of chance may be presented on each of the six sides of a cube modeled in a virtual gaming environment. To play the game chance, 2-D views of the cube from different viewpoints in the 3-D gaming environment may be rendered in real-time and presented to the player. As described below, in some embodiments, the player may even select the viewpoint in the 3-D gaming environment used to generate the 2-D view.

On current gaming machine, the cube would be rendered as a 2-D object generated from the 3-D cube as seen from a particular viewpoint. The particular viewpoint is selected when the game is developed and only 2-D information about the cube as viewed from the selected viewpoint would be stored on an EPROM on the gaming machine. Thus, a game of chance could be presented on the sides of the cube rendered from the 2-D object that was generated from the selected viewpoint of the 3-D cube and stored on the EPROM. However, unless additional 2-D objects were generated from different viewpoints, it is not possible to present a game of chance on the sides of the cube not visible from the selected viewpoint because the 2-D object does not store information regarding the sides of the cube not visible from the selected viewpoint. Further, even if multiple 2-D objects were generated, it is difficult and time consuming to generate enough 2-D objects to allow smooth transitions between viewpoints captured by the 2-D objects. It is also difficult to a scale a 2-D object, either smaller or larger, without introducing distortion effects.

Distortion is also generated when scaling 3-D objects. However, it is easier to deal with using specialized 3-D graphics cards because the card applies a bilinear filtering process to the texels at render time. Without special hardware, such as a 3-D graphics card, it would be difficult to correct for distortion in real-time.

Finally, in a typical 2-D gaming system, due to the limited flexibility of 2D, outcomes for a game of chance rendered in 2D and displayed on a gaming machine have to be quantified and pre-rendered i.e. canned animations. Due to the flexibility of a 3-D gaming system the outcomes can be determined through user input giving an unlimited number of animations in response to the players input. By not having to make a series of pre-canned animations but instead determining the animation in response to the players input saves many bytes in storage space requirements. In following figures, details of methods and apparatus used to present a game of chance generated from a 3-D gaming environment are described.

Returning to FIG. 1, the 3-D gaming environment 100 includes three objects: 1) a rectangular box 101 on top of, 2) a plane 114 and 3) a second box 126. The box 101, box 127 and plane 114 are defined in a 3-dimensional rectangular coordinate space 104. Typically, surfaces of the objects in the gaming environment are defined using a plurality of surface elements. The surface elements may comprise different shapes, such as different types of polygons that are well known in the 3-D graphical arts. For example, the objects in the present information may be defined in a manner to be compatible with one or more graphics standards such as Open Graphics Library (OpenGL). Information on OpenGL may be found at www.opengl.org.

In one embodiment, the objects in the gaming environment 100 may be defined by a plurality of triangular elements. As an example, a plurality of triangular surface elements 125 are used to define a portion of the surface 108 and the surface face 112. In another embodiment, the objects in the gaming environment 100, such as box 101 and box 126, may be defined by a plurality of rectangular elements. In yet another embodiment, a combination of different types of polygons, such as triangles and rectangles may be used to describe the different objects in the gaming environment 100. By using an appropriate number of surface elements, such as triangular elements, objects may be made to look round, spherical, tubular or embody any number of combinations of curved surfaces.

Triangles are by the most popular polygon used to define 3-D objects because they are the easiest to deal with. In order to represent a solid object, a polygon of at least three sides is required (e.g. triangle). However, OpenGL supports Quads, points, lines, triangle strips and quad strips and polygons with any number of points. In addition, 3-D models can be represented by a variety of 3-D curves such as NURBs and Bezier Patches.

Each of the surface elements comprising the 3-D virtual gaming environment may be described in a rectangular coordinate system or another appropriate coordinate system, such as spherical coordinates or polar coordinates, as dictated by the application. The 3-D virtual gaming environments of the present invention are not limited to the shapes and elements shown in FIG. 1 (see FIGS. 2, 3 and 4) or the coordinate system used in FIG. 1 which are shown for illustrative purposes only. Details of 3-D graphical rendering methods that may be used with the present invention are described in "OpenGL Reference Manual: The Official Reference Document to Open GL, Version 1.2," $3^{rd}$ edition, by Dave Shreiner (editor), OpenGL Architecture Review Board, Addison-Wesley Publishing, Co., 1999, ISBN: 0201657651 and "OpenGL Program Guide: The Official Guide to Learning OpenGL, Version 1.2," 3rd edition, by Mason Woo, Jackie Neider, Tom Davis, Dave Shreiner, OpenGL Architecture Review Board, Addison-Wesley Publishing, Co., 1999, ISBN: 0201604582, which are incorporated herein in their entirety and for all purposes.

Surface textures may be applied to each of the surface elements, such as elements 125, defining the surfaces in the virtual gaming environment 100. The surface textures may allow the 3-D gaming environment to appear more "real" when it is viewed on a display screen on the gaming machine. As an example, colors, textures and reflectance's may be applied to each of the surface elements defining the various objects in the 3-D gaming environment. Millions of different colors may be used to add a realistic "feel" to a given gaming environment. Textures that may be applied include smoothness or surface irregularities such as bumps, craters, lines, bump maps, light maps, reflectance maps and refractance maps or other patterns that may be rendered on each element. The textures may be applied as mathematical models stored as "texture maps" on the gaming machine.

In one embodiment, the "texture map" may be an animated texture. For instance, frames of a movie or another animation may be projected onto a 3-D object in the 3-D gaming environment. These animated textures may be captured in 2-D views presented in video frames on the gaming machine. Multiple animated textures may be used at the same time. Thus, for example, a first movie may be projected onto a first surface in the 3-D gaming environment and a second movie may be projected onto a second surface in the 3-D gaming environment where both movies may be viewed simultaneously.

Material properties of a 3-D surface may describe how the surface reacts to light. These surface properties may include such things as a) a material's ability to absorb different wavelengths of light, b) a material's ability to reflect different wavelengths of light (reflectance), c) a material's ability to emit certain wavelengths of light such as the tail lights on a car and d) a material's ability to transmit certain wavelengths of light. As an example, reflectance refers to how much light each element reflects. Depending on the reflectance of a surface element other items in the gaming environment may be reflected fuzzily, sharply or not at all. Combinations of color, texture and reflectance may be used to impart an illusion of a particular quality to an object, such as hard, soft, warm or cold.

Some shading methods that are commonly used with 3-D graphics to add texture that may be applied to the present invention include gourand shading and phong shading. Gourand and phong shading are methods used to hide an object's limited geometry by interpolating between two surfaces with different normals. Further, using Alpha Blending, pixels may be blended together to make an object appear transparent i.e. the object transmits light.

Virtual light sources, such as 102, may be used in the gaming environment to add the appearance of shading and shadows. Shading and shadows are used to add weight and solidity to the rendering of a virtual object. For example, to add solidity to the rectangular box 101, light rays emitted from light source 102 are used to generate a shadow 103 around the rectangular box 101. In one method, ray tracing is used to plot paths of imaginary light rays emitted from an imaginary light source such as 102. These light rays may impact and may reflect off various surfaces affecting the colors assigned to each surface element. In some gaming environments, multiple light sources may be used where the number of lights and the intensity of each light source change with time. Typically, in real time 3D, the light sources do not generate shadows and it is up to the programmer to add shadows manually. As stated earlier, however, the light sources produce shading on objects.

Perspective, which is used to convey the illusion of distance, may be applied to the gaming environment 100 by defining a vanishing point, such as 126. Typically, a single point perspective is used where all of the objects in the scene are rendered to appear as though they will eventually converge at a single point in the distance, e.g. the vanishing point. However, multiple point perspectives may also be employed in 3-D gaming environments of the present invention. Perspective allows objects in the gaming environment appear behind one another. For instance, box 101 and box 127 may be the same size. However, box 127 is made to appear smaller, and hence farther away, to a viewer because it is closer to the vanishing point 126. A 3-D gaming environment may or may not provide perspective correction. Perspective correction is accomplished by transforming points towards the center of the 2-D view screen. The farther away an object is from the viewpoint in 3-D gaming environment, the more it will be transformed into the center of screen.

The present invention is not limited to perspective views or multiple perspective views of the 3-D gaming environment. An orthographic view may be used where 3-D objects rendered in a 2-D view always appear the same size no matter how far away they are in the 3-D gaming environment. The orthographic view is what you would see as a shadow cast from a light source that is infinitely far away (so that the light rays are parallel), while the perspective view comes from a light source that are finitely far away, so that the light rays are diverging. In the present invention, combinations of both perspective and orthographic views may be used. For instance, an orthographic view of a text message may be layered on top of a perspective view of the 3-D gaming environment.

Related to perspective is "depth of field". The depth of field describes an effect where objects that appear closer to a viewer are more in focus and objects that are farther away appear out of focus. Depth of field may be applied renderings of the various objects in the gaming environment 100. Another effect that may be applied to renderings of objects in the gaming environment is "anti-aliasing". Anti-aliasing is used to make lines which are digitally generated as a number of straight segments appear more smooth when rendered on a display screen on the gaming machine. Because the 2D display only takes finite pixel positions, stair stepping occurs on any limes that are not straight up and down, straight across (left and right) or at 45 degrees on the display screen. Stair stepping produces a visually unappealing effect, thus, pixels are added to stair-stepped lines to make this effect less dramatic.

Objects in the gaming environment 101 may be appear to be static or dynamic. For instance, the coordinates of box 127 may change with time while the coordinates of box 101 and plane 114 remain fixed. Thus, when rendered on a display screen on a gaming machine, the box 127 may appear to move in the gaming environment 101 relative to the box 101. Many dynamic effects are possible. For instance, box 127 may appear to rotate while remaining in a fixed position or may rotate while also translating to generate an effect of bouncing or tumbling. Further, in the gaming environment, objects may appear to collide with one another. For instance, box 127 may appear to collide with box 101 altering the trajectory of box 127 in the gaming environment. Many digital rendering effects may be applied to the gaming environment of the present invention. The effects described above have been provided for illustrative purposes only.

Standard alpha-numeric text and symbols may be applied to one or more surface elements in the gaming environment 101 to display gaming information to a game player. The alpha-numeric text and symbols may be applied to various surfaces in the gaming environment to generate a plurality of game displays that may be used as part of game outcome presentations viewed on the gaming machine. For instance, game displays may be rendered on each of the 6 six surface faces of box 101 or box 127 and a plurality of game displays may also be rendered on planar surface 114. In the present invention, game displays may be rendered across one or more surfaces of any polyhedron or other object defined in the gaming environment.

The rendered text and symbols allow game outcome presentations to be generated for different games of chance. For instance, a card hand for a poker game or black jack game may be rendered on each of the faces of box 101 such as surfaces 108, 110 and 112. As another example, keno numbers or bingo numbers may be rendered on different faces of boxes 101 and 127. Further, slot displays and pachinko displays for slot and pachinko game outcome presentations may be rendered on different faces of boxes 101 and 127.

Many different combinations of games of chance may be rendered in the gaming environment 100. For instance, a slot display may be rendered on face 108 of box 101, a black jack game display may be rendered on face 110, poker game display may be rendered on face 112, a keno game display may be rendered on a face on the box 101 opposite face 108, a pachinko game display may be rendered on a face on the box 101 opposite 110 and a bingo game display may be rendered on a face on the box 101 opposite face 112. A different combination of game displays may be rendered on the surfaces of box 127. Other games of chance that may be used in the present invention include but are not limited to dice games (e.g. craps), baccarat and roulette.

In the present invention, games of chance are used to denote gaming activities where a game player has made a wager on the outcome of the game of chance. Depending on the game outcome for the game of chance initiated by the player, the wager may be multiplied. The game outcome may proceed solely according to chance, i.e. without any input by the game player or the game player may affect the game outcome according to one or more decisions. For instance, in a video poker game, the game outcome may be determined according to cards held or discarded by the game player. While in a slot game, the game outcome, i.e. the final position of the slot reels, is randomly determined by the gaming machine.

The combinations of games described above may be rendered at the same time in the 3-D gaming environment. A player may play one or more games in a sequential manner. For instance, a player may select one or more games, make a wager for the one or more games and then initiate the one or more games and view game outcome presentations for the one or more games. A player may also play one or more games in a parallel manner. For instance, a player may select one or more games, make a wager for the one or more games, initiate the one or more games. Before the game outcome presentations have been completed for the one or more selected games, the player may select one or more new games, make a wager for the one or more new games and initiate the one or more new games. Details of a parallel game methodology are described in co-pending U.S. application Ser. No. 09/553,437, filed on Apr. 19, 2000, by Brosnan et al. and entitled "Parallel Games on a Gaming Device," which is incorporated in its entirety and for all purposes.

The rendered text and symbols in a game display are not necessarily planar may be rendered in multiple in dimensions in the gaming environment 100. For example, rendered cards may have a finite thickness or raised symbols. The cards may be dealt by hands that are defined as 3 dimensional object models in the 3-D gaming environment 100 and move as the cards are dealt. As another example, a slot display may be rendered as multidimensional reels with symbols (see FIG. 2) that may rotate in the gaming environment 100.

A game display for a game outcome presentation may be rendered on a particular surface and may change with time in response to various player inputs. For example, in a poker game, a player may discard and hold various cards while they are playing the game. Thus, the cards in the hand change as the game outcome is rendered in the 3-D gaming environment and some cards (e.g. discarded cards) may appear to leave the gaming environment. As another example, reels on a slot display rendered in the gaming environment may begin to spin in the gaming environment in response to a player pulling a lever or depressing an input button on the physical gaming machine.

Other game features and gaming information may also be rendered in the gaming environment 100. For example, bonus games, promotions, advertising and attraction graphics may also be rendered in the gaming environment. For instance, a casino's logo or a player's face may be rendered in the gaming environment. These additional game features may be integrated into a game outcome presentation on the gaming machine or other operational modes of the gaming machine such as an attract mode.

In another embodiment of the present invention, a virtual person, e.g. a 3-D dimensional model of a portion (e.g., face, hands, face, head and torso, etc.) or all of a human being may be rendered in the 3-D gaming environment. The virtual person may be animated. For the instance, by adjusting parameters of the 3-D dimensional model of the virtual person in a sequence, the virtual person may appear to speak or gesture. The virtual person may be used to explain gaming instructions to a game player or may be used as a component in a game presentation. The virtual person may appear to respond or interact with a user according to inputs into the gaming machine made by the user. For instance, a player may ask the virtual person a particular question via an input mechanism on the gaming machine such as microphone on a gaming machine equipped with voice recognition software. Next, the virtual person may appear to speak a response to the question input by the user. Animated 3-D models for other objects, such as animals or fictional characters, may also be used in the 3-D gaming environment.

After the gaming environment is defined in 3-dimensions, to display a portion of the 3-D gaming environment on a display screen on the gaming machine, a "photograph" of a portion of the gaming environment is generated. The photograph is a 2-dimensional rendering of a portion of the 3-dimensional gaming environment. Transformations between 3-D coordinate systems and 2-D coordinate systems are well known in the graphical arts. The photograph may be taken from a virtual "camera" positioned at a location inside the gaming environment 100. A sequence of photographs taken by the virtual camera in the gaming environment may be considered analogous to filming a movie.

A "photograph" displayed on the display screen of a gaming machine may also a composite of many different photographs. For instance, a composite photograph may be generated from portions of a first photograph generated using an orthographic view and portions of a second photograph generated using a perspective view. The portions of the photographs comprising the composite photograph may be placed on top of one another to provide "layered" effects, may be displayed in a side by side manner to produce a "collage" or combinations thereof.

In another embodiment of the present invention, a photograph may be a blended combination of two different photographs. Using an interpolation scheme of some type, two photographs may be blended in a sequence of photographs to provide a morphing effect where the first photograph appears to morph into a second photograph. For instance, a slot game may appear to morph into a poker game.

Operating parameters of the virtual camera, such as its position at a particular time, are used to define a 3-D surface in the gaming environment, which is projected on to a 2-D surface to produce the photograph. The 3-D surface may comprise portions a number of 3-D objects in the 3-D gaming environment. The 3-D surface may also be considered a 3-D object. Thus, a photograph is a 2-D image derived from 3-D coordinates of objects in the 3-D gaming environment. The virtual camera may represent gaming logic stored on the gaming machine necessary to render a portion of the 3-D gaming environment 100 to a 2-D image displayed on the gaming machine. The photograph is converted into a video frame, comprising a number of pixels, which may be viewed on a display screen on the gaming machine.

The transformation performed by the virtual camera allowing a portion of the virtual gaming environment to be viewed one or more display screens on the gaming machine may be a function of a number of variables. The size of lens in the virtual gaming environment, the position of the lens, a virtual distance between the lens and the photograph, the size of the photograph, the perspective and a depth variable assigned to each object are some of the variables that may be incorporated into a transformation by the virtual camera that renders a photograph of the virtual gaming environment. The resolution of the display screen on the gaming machine may govern the size of a photograph in the virtual camera. A typical display screen may allow a resolution of 800 by 600 color pixels although higher or lower resolution screens may be used. A "lens size" on the virtual camera defines a window into the virtual gaming environment. The window is sometimes referred to as a viewport. The size and position of the lens determines what portion of the virtual gaming environment 100 the virtual camera views.

After the photograph of the virtual gaming environment has been generated, other effects, such as static and dynamic anti-aliasing, may be applied to the photograph to generate a frame displayed on one or more displays located on the gaming machine. Typically, the mathematical and logical operations, which are encoded in gaming software logic, necessary to perform a particular transformation and generate a video frame may be executed by video cards and graphics cards located on the gaming machine and specifically designed to perform these operations. The graphics cards usually include graphical processing units (GPUs). However, the transformation operations may also be performed by one or more general purpose CPUs located on the gaming machine or combinations of GPUs and CPUs.

In general, the 2D/3D video graphics accelerators or coprocessors, often referred to as graphics processing units (GPUs), are located on or connected to the master gaming controller and are used to perform graphical operations. The solutions described are most commonly found as video cards. The graphical electronics may be incorporated directly onto the processor board (e.g. the master gaming controller) of the gaming machine, and even tightly integrated within other very large scale integrated chip solutions. The integration methods are often cost saving measures commonly used to reduce the costs associated with mass production. For instance, video cards, such as the Vivid!XS from VideoLogic Systems (VideoLogic Systems is a division of Imagination Technologies Group plc, England) may used to perform the graphical operations described in the present invention. As another example, video cards from Nvidia Corporation (Santa Clara, Calif.) may be employed. In one embodiment, the video card may be a multi-headed 3-D video card, such as a Matrox G450 (Matrox Graphics Inc., Dorval, Quebec, Canada). Multi-headed video cards let a single graphics card power two displays simultaneously or render two images simultaneously on the same display.

When displaying photographs from a virtual camera in a 3-D gaming environment, a single image from the camera may be divided among a plurality of display devices. For instance, four display screens may be used to display one quarter of a single image. The video feeds for each of the plurality of display devices may be provided from a single video card. Multi-headed video cards let a single graphics card (or graphics subsystem) display output on two or more displays simultaneously. This may be multiple output rendering for each display or one rendering over multiple displays, or variation of both. For example, when a multi-headed video card is used, a first head on the multi-headed video card may be used to render an image from a first virtual camera in a 3-D gaming environment and a second head on the multi-head video card may be used to render a second image from a second virtual camera in a 3-D gaming environment. The rendered first and second images from the first head and the second head may be displayed simultaneously on the same display or the first image may be displayed on a first display and the second image may be displayed on a second display.

Returning to FIG. 1, three lenses, 105, 106 and 107 used in a virtual camera are shown positioned at three locations in the virtual gaming environment. Each lens views a different portion of the gaming environment. The size and shape of the lens may vary which changes a portion of the virtual gaming environment captured by the lens. For instance, lenses 105 and 106 are rectangular shaped while lens 107 is ovular shaped.

Lens 106 is positioned to view the "game display" for a game outcome presentation rendered on surface 108. The portion of the gaming environment captured by lens 106 is a six-sided shape 120. As described above, the game display may contain the presentation of a particular game played on the gaming machine, such as a hand of cards for a poker game. After applying an appropriate transformation, a photograph 124 of the portion of the virtual gaming environment 100 in volume 120 is generated by the virtual camera with lens 106.

Using differing terminology common within the 3D graphics community, the lenses 105, 106 and 107 may be described as a camera. Each camera has the ability to have different settings. A scene in the 3-D gaming environment is shot from the camera's viewpoint. A different scene is captured from each camera. Thus, the scene is rendered from the camera to produce and image.

The photograph 124 generated from the virtual camera with lens 106 may be viewed on one or more display screens on the gaming machine. For instance, photograph 124 may be viewed on a main display on the gaming machine and a secondary display on the gaming machine. In another embodiment, a portion of photograph 124 may be displayed on the main display and a portion of the photograph may be displayed simultaneously on a secondary display. In yet another embodiment, a portion of photograph 124 may be displayed on a first gaming machine while a portion of photograph 124 may be displayed simultaneously on a second gaming machine.

Lens 105 of a virtual camera is positioned to view volume 121 in the virtual gaming environment 100. The volume 121 intersects three faces, 108, 110 and 112, of box 101. After applying an appropriate transformation, a photograph 125 of the portion of the virtual gaming environment 101 in volume 121 is rendered by the virtual camera with lens 105 which may be displayed on one of the display screens on a gaming machine.

Lens 107 of a virtual camera is positioned to view volume 122 in the virtual gaming environment 100. The ovular shape of the lens produces a rounded volume 122 similar to a light from a flashlight. The volume 122 intersects a portion of face 110 and a portion of plane 114 including a portion of the shadow 103. After applying an appropriate transformation, a photograph 126 of the portion of the virtual gaming environment 101 in volume 122 is rendered by the virtual camera with lens 107 which may be displayed on one or more of the display screens on a gaming machine. For instance, a gaming machine may include a main display, a secondary display, a display for a player tracking unit and a remote display screen in communication with the gaming machine via a network of some type. Any of these display screens may display photographs rendered from the 3-D gaming environment.

A sequence of photographs generated from one or more virtual cameras in the gaming environment 101 may be used to present a game outcome presentation on the gaming machine or present other gaming machine features. The sequence of photographs may appear akin to movie or film when viewed by the player. For instance, a 3-D model of a virtual person may appear to speak. Typically, a refresh rate for a display screen on a gaming machine is on the order of 60 HZ or higher and new photographs from virtual cameras in the gaming environment may be generated as the game is played to match the refresh rate.

The sequence of photographs from the one or more virtual cameras in the gaming environment may be generated from at least one virtual camera with a position and lens angle that varies with time. For instance, lens 106 may represent the position of a virtual camera at time, $t_1$, lens 105 may represent the position of the virtual camera at time, $t_2$, and lens 107 may represent the position of the virtual camera at time $t_3$. Photographs generated at these three positions by the virtual camera may be incorporated into a sequence of photographs displayed on a display screen.

The position of the virtual camera may change continuously between the positions at times $t_1$, $t_2$, $t_3$ generating a sequence of photographs that appears to pan through the virtual gaming environment. Between the positions at times $t_1, t_2, t_3$, the rate the virtual camera is moved may be increased or decreased. Further, the virtual camera may move non-continuously. For instance, a first photograph in a sequence of photographs displayed on a display screen may be generated from the virtual camera using the position of lens 106. The next photograph in the sequence of photographs may be generated from the virtual camera using the position of lens 105. A third photograph in the sequence of photographs may be generated from the virtual camera using the position of lens 107. In general, the virtual camera in the gaming environment 101 may move continuously, non-continuously and combinations thereof.

In a game presentation, a plurality of virtual cameras, with time varying positions, in a plurality of virtual gaming environments may be used. The camera and environment information as a function of time may be stored on the gaming machine and may be accessed when a particular scene for a game event in a game outcome presentation is needed such that the scene may be rendered in "real-time". A scene may be defined by the positions of one or more virtual cameras in one or more gaming environments as a function of time. The scenes may be modularized, i.e. a library of scenes may be generated, so that they may be incorporated into different games. For instance, a scene of a button being depressed may be incorporated into any game using this type of sequence.

A sequence of photographs generated from a first virtual camera in a first virtual gaming environment may be displayed simultaneously with a sequence of photographs generated from a second virtual camera in a second virtual gaming environment. For instance, the first sequence of photographs and second sequence and second sequence of photographs may be displayed on a split screen or may be displayed on different screens. In addition, the first virtual camera in a first virtual gaming environment and the second virtual camera may be located in a second virtual gaming environment different from the first virtual gaming environment. Also, the first virtual gaming environment and the second virtual gaming environment may be in the same gaming environment. Further, a single virtual camera may jump between different gaming environments, such as between a game play environment to a bonus game environment. The transition between the gaming environments may also appear to be smooth (e.g. the camera may pan from one environment in a continuous manner).

In some embodiments, a player may be to select one or more virtual gaming environments used in a game play on a gaming machine. For instance, a first gaming environment may involve a city-scape, such as New York, while a second gaming environment may involve a city-scape, such as Paris. During a game play on a gaming machine, a player may be able to select New York or Paris as a city-scape for the virtual gaming environment used during game play. The different game environments and different scenes generated from the environments may be stored in a memory on the gaming machine as a library of some type.

Figure 5:
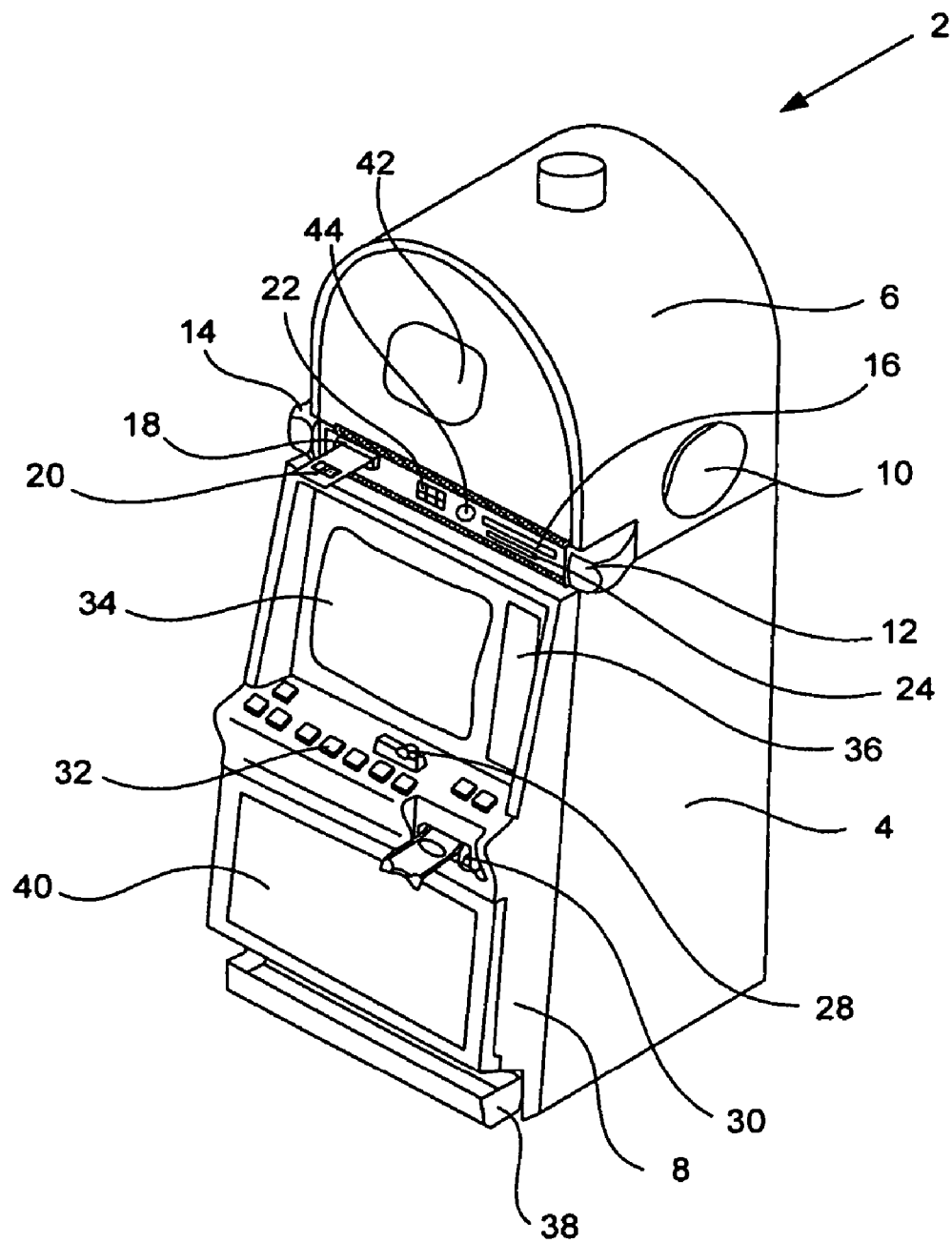
FIG. 5 is a is a perspective drawing of a gaming machine.

In particular embodiments, while using the gaming machine, a player may be able to control the position of the virtual camera using an input mechanism on the gaming machine (see FIG. 5). For instance, a player may be able to move the position of lens 106 closer to the surface 108 in the gaming environment 108 which generates the appearance of zooming or the object may be moved closer to the camera. For multiple hand card games, a player may be able to zoom-in on a particular hand to "expand on demand" the hand increasing the visibility of the hand. For instance, a player may use an input mechanism to "scroll" the camera and view larger portions. As another example, the player may be able maneuver a virtual camera through the gaming environment or select a scene in the gaming environment. An opportunity to move the virtual camera may be triggered by certain game events such as a bonus game event on the gaming machine or the movement of the camera may be scripted (e.g. pre-determined) as part of the game playing sequence. For example, as part of the play of a bonus game event, a player may be able to choose from a number of doors leading to different rooms with treasure chests. When the player enters one of the rooms, the chest is opened their bonus award is revealed.

With the present invention, some advantages of generating a 3-D gaming environment that may be rendered in real-time to a display screen are as follows. First, it allows a player to be presented and possibly control a complex game outcome presentation in real-time. Thus, the game outcome presentation may be varied from game to game in a manner determined by the player. Traditional game outcome presentations have been modeled in 2-D and little control has been given to the player. Thus, traditional game outcome presentations do not vary much from game to game. Second, screen resolution issues associated with presenting a large number of games simultaneously on a single screen may be avoided by modeling the games in 3-D gaming environment.

At any given time during a game presentation viewed on a display screen on the gaming machine, only a portion of the plurality of the games modeled in the 3-D gaming environment may be visible to the player. Thus, a game playing are in a 3-D gaming environment is greater than a 2-D gaming environment because a game of chance may be presented on surfaces modeled in the 3-D gaming environment that may be hidden from view. In a 2-D gaming environment, there is not any hidden surfaces i.e. "what you see" is "what you get." Since the viewpoint in the 3-D model may be varied, the player or gaming machine may zoom-in on one or more games of interest, some of which may be hidden in a current 2-D view, and select a desirable resolution level. Thus, all of the games or game components do not have to be rendered on a single screen simultaneously.

Figure 2:
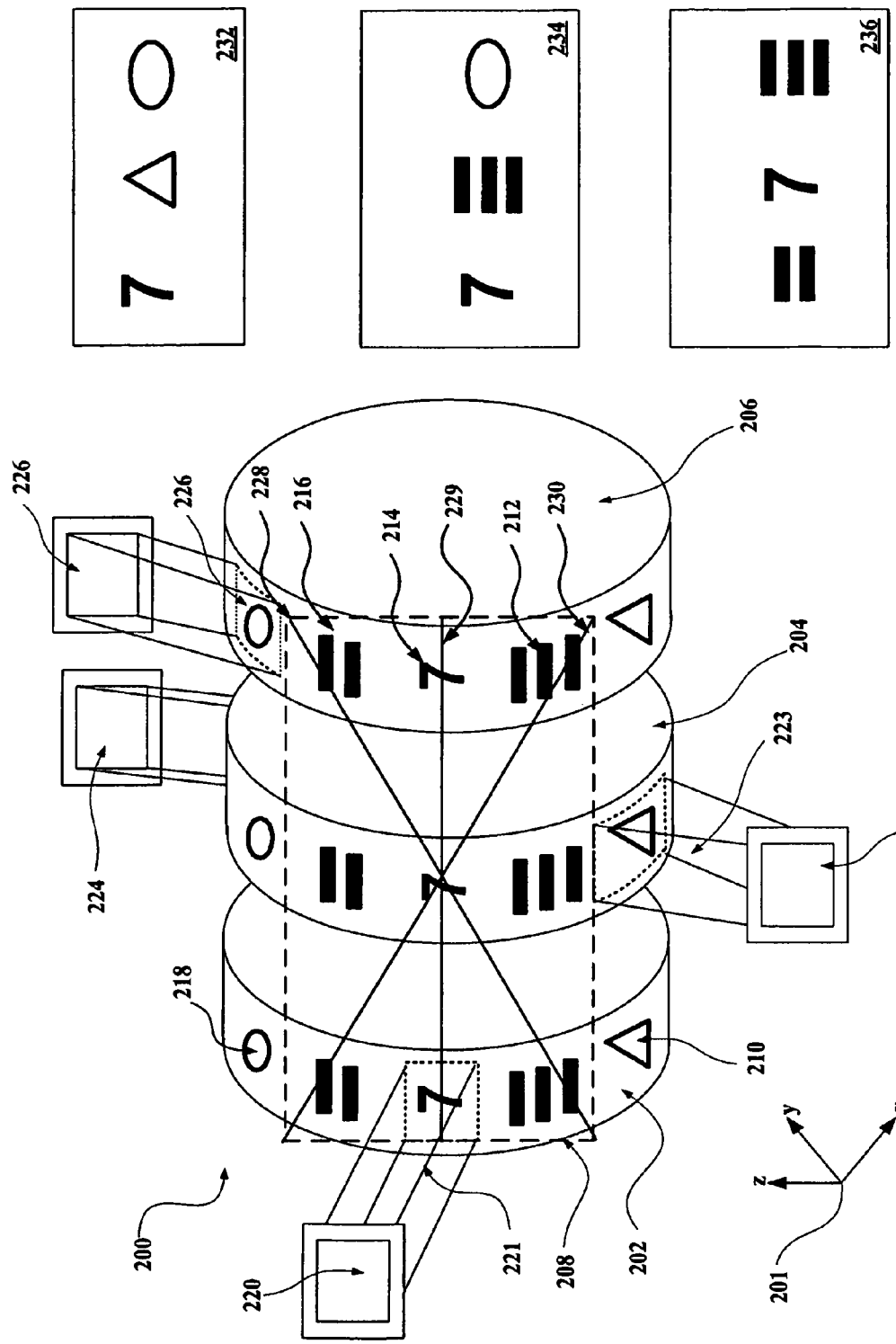
FIG. 2 is a is a perspective drawing of virtual slot reels in a 3-D virtual gaming environment implemented on a gaming machine for one embodiment of this invention.

FIG. 2 is a is a perspective drawing of three virtual slot reels, 202, 204 and 206 in a 3-D virtual gaming environment 200 implemented on a gaming machine for one embodiment of this invention. The three slot reels are modeled as cylinder portions in coordinate space 201. The reels appear to be hanging space. Different symbols are rendered on each reel including a triangle 210, a triple bar 212, a "seven" 214, double bar 216 and an oval 218. Other symbols (not shown) may be rendered on the backs of the reels. In a virtual 3-D slot gaming environment, such as 200, a size of the reels, a number of reels, a number of symbols on the reels and types of symbols on the reels may be varied. Also, background scenery (not shown) may be also varied in the environment.

A window 208 is rendered over the reels, 202, 204 and 206, to illustrate a number of symbols that may be visible on a mechanical slot display. At most, nine symbols, e.g. the three double bars, three sevens and three triple bars may be viewed on the mechanical slot display. When multiple symbols are viewed by the player, the multiple symbols may be used to generate multiple paylines that may be wagered on during game play.

When reels on a gaming machine stop after a wager has been received and a game has been initiated, a combination of symbols along a payline may be compared to winning combinations of symbols to determine an award for the game. For instance, three paylines 228, 229 and 230 are shown. Three "sevens" symbols are along payline 229. A triple bar, a seven and a double bar are shown along paylines 228 and 230. Often triple seven combination is used as a winning combination on slot games. The number of paylines increases the betting opportunities for a given game and multiple payline games are desired by some players. In some slot games, only a single line of symbols may be viewed, such as the three sevens, and a player may bet on only a single payline.

For a game outcome presentation, the slot reels 202, 204 and 206 may each begin to rotate and move in the virtual gaming environment. In the virtual space 200, the reels may rotate in different directions, translate, rotate around different axis, shrink in size or grow in size as the reels are not limited by the constraints of actual mechanical slot reels. During the game outcome presentation, a virtual camera, which may vary its position as a function of time, may film a sequence (e.g., generate a number of photographs in a sequence) that are displayed on a display screen on the gaming machine and that capture the motion of the reels.

A number of virtual cameras may be positioned in the virtual gaming environment 200 to capture one or more symbols on the slot reels. For instance, lens 220 of a virtual camera captures the "7" symbol on reel 202 in volume 221 of the virtual gaming environment 200. Lens 222 of a virtual camera captures the "triangle" symbol on reel 204 in volume 223 of the virtual gaming environment. Lens 224 of a virtual camera captures a "triple bar" symbol (not shown) on reel 204 of the virtual gaming environment. Finally, Lens 226 of a virtual camera captures the "oval" symbol on reel 206 in volume 226 of the virtual gaming environment. However, a single virtual camera may also by used to capture multiple symbols such as a line of symbols across multiple reels.

The symbols captured from the virtual cameras using lens 220, 222, 224 and 226 may be used to create various paylines that may be used for wagering. For example, the symbols captured from lens 220, 222 and 226 are used to generate a first combination of symbols 232 which may wagered on during game play. The symbols captured from lens 220, 224 and 226 are used to generate a second combination of symbols 234 which may wagered on during game play. Finally, virtual cameras may be positioned along payline 230 to capture the combination of symbols 236.

In the present invention, the number of paylines that may be implemented is quite large. For instance, for three virtual reels with 25 symbols on each reel, $25^3$ paylines may be utilized. In one embodiment, to aid in the display of a large amount of gaming information generated in one virtual gaming environment, gaming information generated in a first gaming environment may be transferred to a second gaming environment. For example, gaming information regarding combinations of symbols along a plurality of paylines generated in gaming environment 200 may be transferred to a second gaming environment with virtual cameras for rendering it to a display viewed by a player.

In another embodiment, the slot reels 202, 204, 206 may be appear translucent such that symbols on the back of the reel may be visible from the front. Paylines, that may be wagered on by a player, may be rendered in "virtual space" to connect symbols on the front of a reel to a symbol on the back of the reel. For instance, a payline may be rendered from the front of reel 202 to the back of reel 204 and to the front of reel 206.

Figure 3:
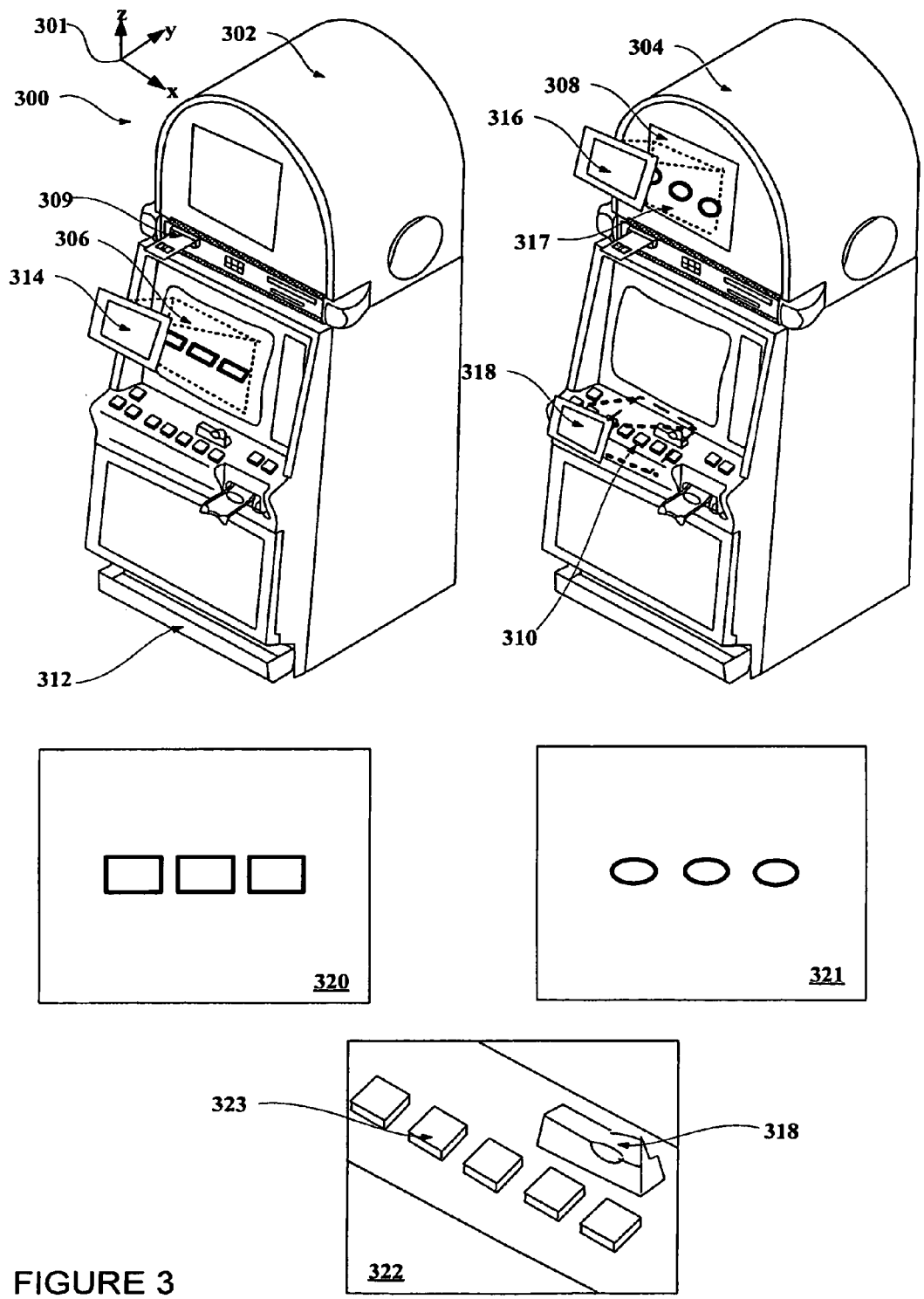
FIG. 3 is a is a perspective drawing of two gaming machines in a 3-D virtual gaming environment implemented on a gaming machine for one embodiment of this invention.

FIG. 3 is a is a perspective drawing of two gaming machines in a 3-D virtual gaming environment 300 implemented on a gaming machine for one embodiment of this invention. In the gaming environment 300, two gaming machines 302 and 304 with components, such as a main display 306, a secondary display, input buttons 310, a coin hopper 312 and a coin acceptor 318 are modeled in coordinate space 301. Other features of the gaming machines are described with respect to FIG. 5.

Three "photographs" 320, 321 and 322 from virtual cameras with lenses 314, 316 and 318 are shown. Photograph 320 shows a slot game display on the virtual gaming machine 302 and photograph 321 shows a bonus game display on the virtual gaming machine 304. Both photographs may be displayed on an actual display on the physical gaming machine. During a game outcome presentation, a virtual camera with lens 314 may show a game outcome on virtual main display 306 on gaming machine 302 and then when a bonus game is triggered the position of the virtual camera may be continuously moved to the position of 316 to capture the bonus game display on virtual secondary display 308 on gaming machine 304. When a player wins an award, the virtual camera may move to a position over virtual hopper 312 and virtual coins may be added to the hopper to simulate a win.

In another embodiment of the present invention, each gaming machine 302 and 304 may show a different game on its virtual main display. A player may be able to move a virtual camera in gaming environment 300 using input buttons on the real gaming machine to select either the game displayed on gaming machine 302 or the game displayed on gaming machine 304 for a game play. In another example, the player may be able to select both gaming machines 302 and 304 for simultaneous game play and make a single wager or separate wagers for the games played on each machine. The game player may then operate the virtual camera to examine the game outcome for each game such as zoom-in on one of the displays on gaming machine 302 or 304.

The gaming machines may be modeled from CAD/CAM drawings of actual gaming machines or other modeling formats. In one embodiment of the present invention, the physical gaming machine on which a game is played may be modeled as a virtual gaming machine in a virtual gaming environment such as 300. The virtual gaming machine in the virtual environment may be used to demonstrate various operating and maintenance features for the real gaming machine. For example, when a player needs to press an input button to play a game, a virtual input button 323 being depressed (see photograph 322) modeled from the physical gaming machine may be shown on the display screen of the gaming machine to aid the player. As another example, a player may be shown how to correctly insert a player tracking card into a card reader on the gaming machine using the virtual gaming machine. In yet another example, the player may be shown how to perform an electronics funds transfer, how to view an alternate video presentation or how to view other entertainment content available on the gaming machine. In another embodiment, a player may be required to use an electronic key with a gaming device connected to the gaming machine. For example, an electronic key may be used to gain access a particular function on the gaming machine. The electronic key may be compatible with one or more communication protocols used by the gaming device such as but not limited to wire communication protocols like USB, serial, parallel, Firewire and wireless communication protocols like IrDA, IEEE 802.11a, IEEE 802.11b and Bluetooth.

Various maintenance procedures may be modeled in the virtual gaming environment which may be used to aid a person performing a maintenance operation on the gaming machine. A virtual 3-D maintenance manual may be stored on the gaming machine or on a remote host accessible to the gaming machine. For instance, a procedure for adding paper to printer on the gaming machine may be modeled in a 3-D virtual gaming environment. When a casino service person changes the paper in the printer, a 3-D simulation of the procedure using a virtual model of gaming machine 302 with printer 309 may be rendered on the display screen of the actual gaming machine to aid the service person.

Figure 4:
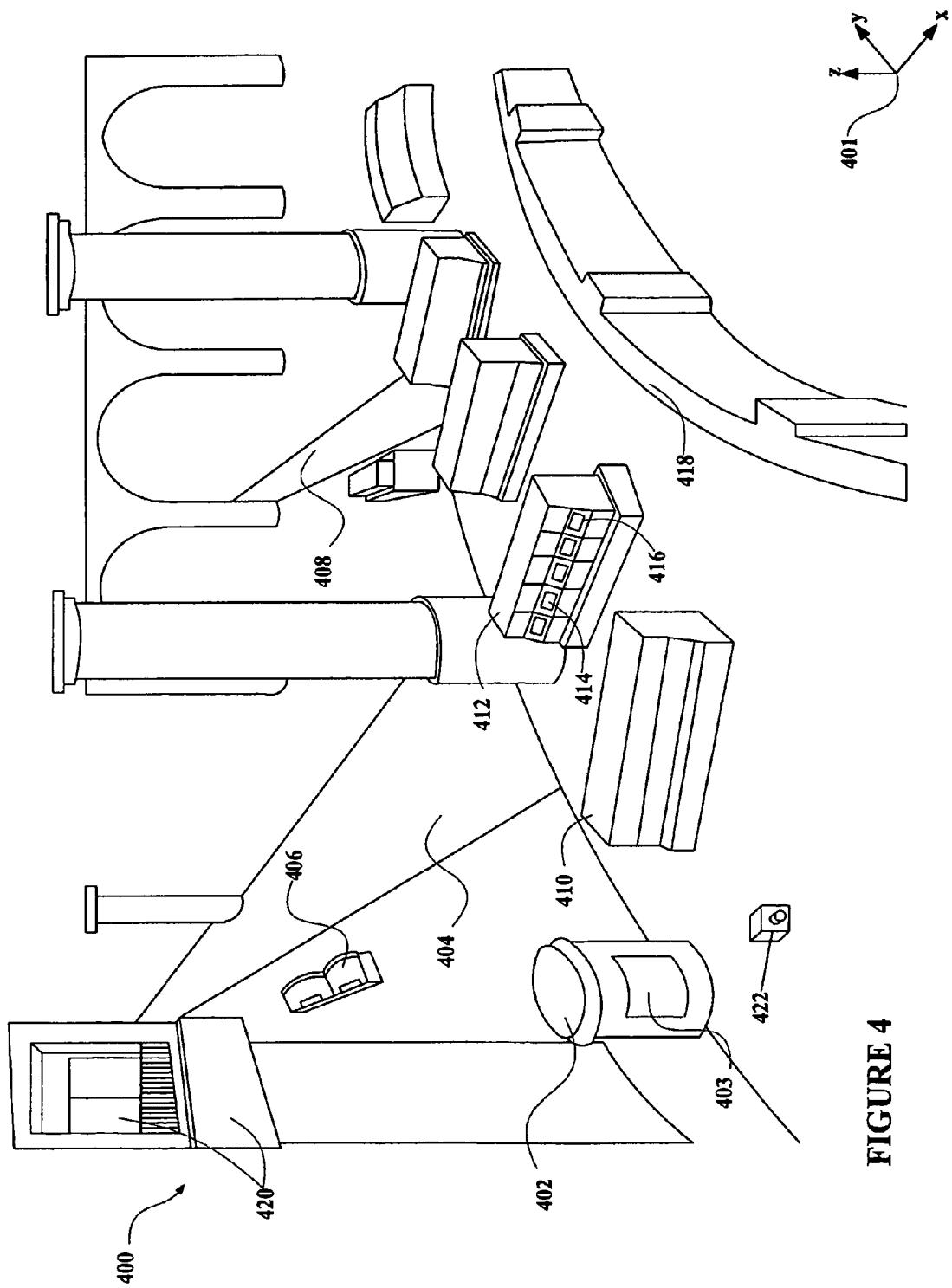
FIG. 4 is a is a perspective drawing of a virtual casino in a 3-D virtual gaming environment implemented on a gaming machine for one embodiment of this invention.

FIG. 4 is a is a perspective drawing of a virtual casino in a 3-D virtual gaming environment 400 implemented on a gaming machine for one embodiment of this invention. The virtual casino may be an actual model of the casino where the game is being played. The virtual casino is modeled with banks of gaming machines, such as 410 and 412, architectural features, such as window and balcony 420 and wall 418, gaming tables 406, walkways, such as 404 and 408, a casino kiosk 402 with a kiosk display 403, pillars and arches. The virtual casino is modeled in coordinate system 401.

The virtual casino may be used by the player to select various games to play on the physical gaming machine by operating a virtual camera 422 in the 3-D gaming environment 400. For instance, the player may be able to position the virtual camera to select between games played on gaming machines 414 and 416 or a table game played at table 406. The player or gaming program may move the camera 422 to follow path 404 or 408 to enter a different room as part of a game presentation. For example, a player may be shown a "treasure" or secret room as part of bonus game on the gaming machine. The treasure room may correspond to a theme consistent with the theme of the casino.

When the actual casino where the gaming machine is located is modeled in the gaming machine, a player may use the virtual casino to explore and locate various casino features such as restaurants and shops or locate another game player in the casino. Also, the virtual casino may also be used to give the player directions. As another example, the virtual casino may be used to locate other player and perhaps initiate a conversation with another player (e.g. instance messaging). Further, the virtual casino may be used by the player as an interface to obtain gaming information and casino services. For instance, the player may go to the virtual kiosk 403 to obtain information about their player tracking account, to redeem a prize or make dinner/entertainment reservations. As another example, a player may go to a virtual bar or a virtual café to order a drink or a snack.

Turning to FIG. 5, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, plasma/LED display or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor.

Typically, after a player has initiated a game on the gaming machine, the main display monitor 34 and the second display monitor 42 visually display a game presentation, including one or more bonus games, controlled by a master gaming controller (not shown). The bonus game may be included as a supplement to the primary game outcome presentation on the gaming machine 2. The video component of the game presentation consists of a sequence of frames refreshed at a sufficient rate on at least one of the displays, 34 and 42, such that it appears as a continuous presentation to the player playing the game on the gaming machine. Each frame rendered in 2-D on display 34 and/or 42 may correspond to a virtual camera view in a 3-D virtual gaming environment stored in a memory device on gaming machine 2.

One or more video frames of the sequence of frames used in the game presentation may be captured and stored in a memory device located on the gaming machine. The one or more frames may be used to provide a game history of activities that have occurred on the gaming machine 2. Details of frame capture for game history applications are provided co-pending U.S. application Ser. No. 09/689,498, filed on Oct. 11, 2000 by LeMay, et al., entitled, "Frame Buffer Capture of Actual Game Play," which is incorporated herein in its entirety and for all purposes.

Returning to the gaming machine in FIG. 5, the information panel 36 may be a back-lit, silk screened glass panel with lettering to indicate general game information including, for example, the denomination of bills accepted by the gaming machine (e.g. $1, $20, and $100). The bill validator 30, player-input switches 32, video display monitor 34, and information panel are devices used to play a game on the game machine 2. The devices are controlled by the master gaming controller, which is located inside the main cabinet 4 of the machine 2.

In the example, shown in FIG. 5, the top box 6 houses a number of devices, which may be used to input player tracking information or other player identification information into the gaming machine 2, including the bill validator 30 which may read bar-coded tickets 20, a key pad 22, a florescent display 16, and a camera 44, and a card reader 24 for entering a magnetic striped cards or smart cards. The camera 44 may be used to generate player images that are integrated into a virtual gaming environment implemented on the gaming machine. The key pad 22, the florescent display 16 and the card reader 24 may be used to enter and display player tracking information. In addition, other input devices besides those described above may be used to enter player identification information including a finger print recording device or a retina scanner. Methods and apparatus for capturing a player's image to a video frame is described in co-pending U.S. patent application Ser. No. 09/689,498, by LeMay et al. filed on Oct. 11, 2000 and titled "Frame Buffer Capture of Actual Game Play" is incorporated herein in its entirety and for all purposes.

In addition to the devices described above, the top box 6 may contain different or additional devices than those shown in the FIG. 5. For example, the top box may contain a bonus wheel or a back-lit silk screened panel which may be used to add bonus features to the game being played on the gaming machine. During a game, these devices are controlled and powered, in part, by the master gaming controller circuitry (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 5, when a user selects a gaming machine 2, he or she inserts cash through the coin acceptor 28 or bill validator 30. Additionally, the bill validator may accept a printed ticket voucher, which may be accepted by the bill validator 30 as an indicia of credit. Once cash or credit has been accepted by the gaming machine, it may be used to play a game on the gaming machine. Typically, the player may use all or part of the cash entered or credit into the gaming machine to make a wager on a game play. During the course of a game, a player may be required to make a number of decisions which affect the outcome of the game. For example, a player may vary his or her wager, select a prize, or make game-time decisions which affect the game play. These choices may be selected using the player-input switches 32, the main video display screen 34 or using some other device which enables a player to input information into the gaming machine including a key pad, a touch screen, a mouse, a joy stick, a microphone and a track ball.

In some embodiments, to change the format of a game outcome presentation on the gaming machine or to utilize different gaming machine functions, the player may use an input device on the gaming machine to control a virtual camera in a virtual gaming environment implemented on the gaming machine. For instance, a player may use the virtual camera to "zoom in" or "expand on demand" a portion of the virtual gaming environment such as one poker hand of a hundred poker hands displayed on display screen 34. In another example, the game player may alter the game outcome presentation, such as the view or perspective of the game outcome presentation, by controlling the virtual camera. In yet another example, the player may be able to select a type of game for game play on the gaming machine, select a gaming environment in which a game is played, receive casino information or obtain various casino services, such as dinner reservations and entertainment reservations, by navigating through a virtual casino implemented on the gaming machine. The virtual casino may correspond to the actual casino where the gaming machine is located. Thus, the virtual casino may be used to give the player directions to other portions of the casino.

In other embodiments of the present invention, CAD/CAM models of the gaming machine 2 may be used to generate a virtual 3-D model of the gaming machine. The virtual 3-D model may be used to visually demonstrate various operating features of the gaming machine 2. For instance, when a player tracking card is inserted incorrectly in the card reader 24, the virtual 3-D model of the gaming machine may be used to display a visual sequence of the card being removed from the card reader 24, flipped over and correctly inserted into the card reader 24. In another example, a visual sequence showing a player inputting an input code on the key pad 22 may be used to prompt and show the player how to enter the information. In another example, when the gaming machine 2 is expecting an input from the player using one of the player input switches 32, the virtual 3-D model of the gaming machine may be used to display a visual sequence of the correct button on the gaming machine being depressed. In yet another example, the manner in which a bill or ticket is inserted into the bill validator may be shown to the player using a sequence of photographs generated from the 3-D model.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. The ability of a player to control a virtual camera in a virtual gaming environment to change the game outcome presentation may also add to the excitement of the game. After the player has completed a game, the player may receive game tokens from the coin tray 38 or the ticket 20 from the printer 18, which may be used for further games or to redeem a prize.

Figure 6:
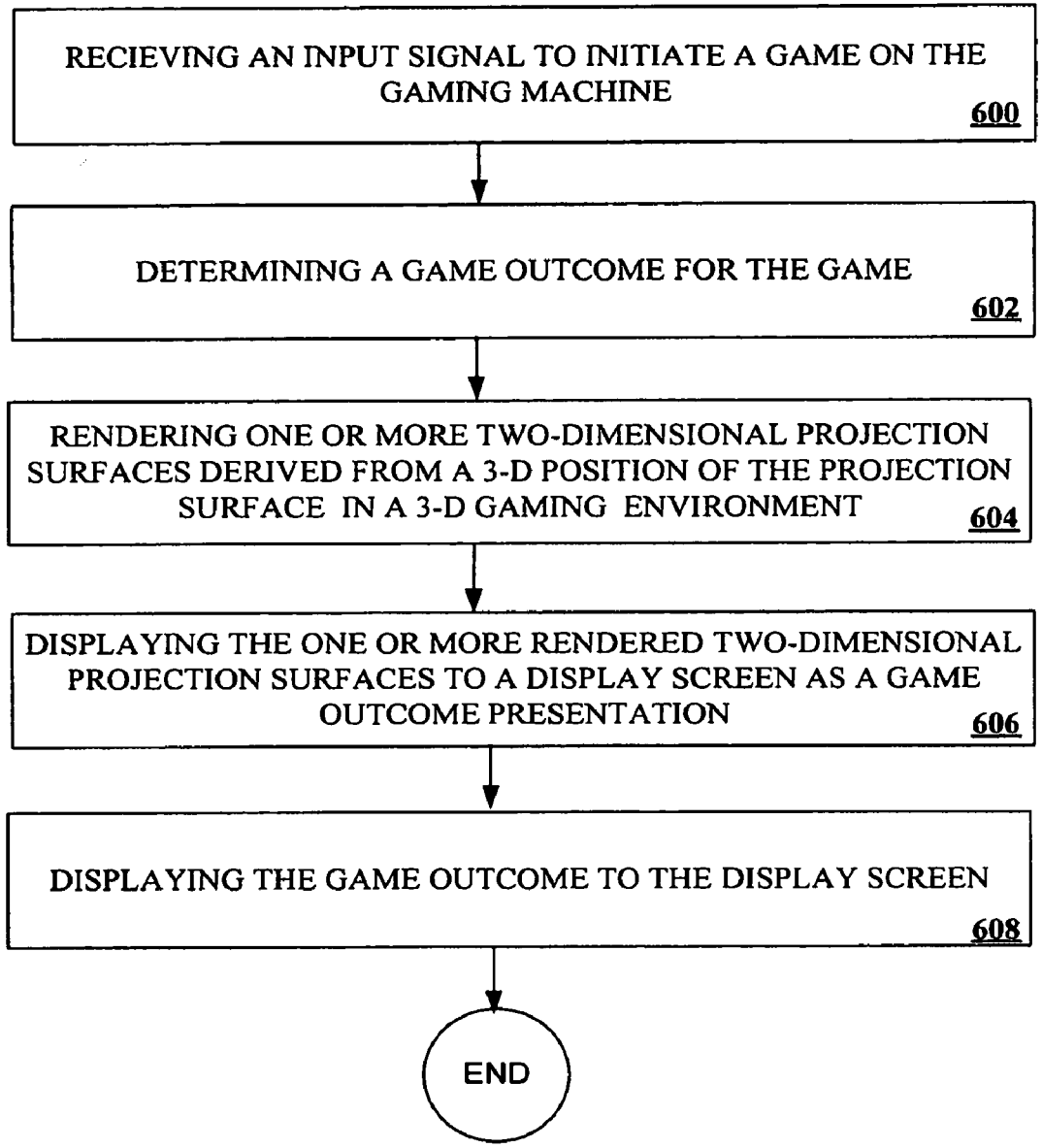
FIG. 6 is a flow chart depicting a method for generating a game outcome presentation using a 3-D virtual gaming environment.

FIG. 6 is a flow chart depicting a method for generating a game outcome presentation from a virtual gaming environment. In 600, after receiving a wager for one or more games played on a gaming machine, an input signal is received on the gaming machine to initiate a game of chance. The input signal may be input by a player using a various input devices available on the gaming machine, such as input buttons and a touch screen. In 602, one or more game outcomes are determined for the one or more games initiated by the game player. Typically, a game outcome is determined by generating one or more random numbers and comparing the numbers with a paytable stored on the gaming machine.

In 603, based upon the one or more game outcomes determined in 602, one or more game displays is rendered in a 3-D virtual game environment in the gaming machine. In 604, at least one virtual camera in the 3-D gaming environment is used to render a sequence of 2-D projection surfaces (e.g. images) derived from three-dimensional coordinates of surfaces in the 3-D gaming environment. As described with reference to FIG. 2, the position of the virtual camera may vary with time. In 606, the sequence of rendered 2-D projection surfaces is displayed to one or more game display screens on the gaming machine as part of a game outcome presentation or a bonus game presentation. In 608, the game outcome (e.g. an amount awarded for one or more games) is displayed to the display screen. The method described above is not limited to game outcome presentations. Other types of gaming information such as attract mode presentations, maintenance operation information, game operation information and casino information may be generated in a 3-D virtual gaming environment and displayed to a display screen on the gaming machine. Further, transition screens that allow a smooth transition between different gaming presentations may also be generated and displayed on the display screen. For instance, a transition screen may be generated to for a display a smooth transition between a game outcome presentation and a bonus game.

Figure 7:
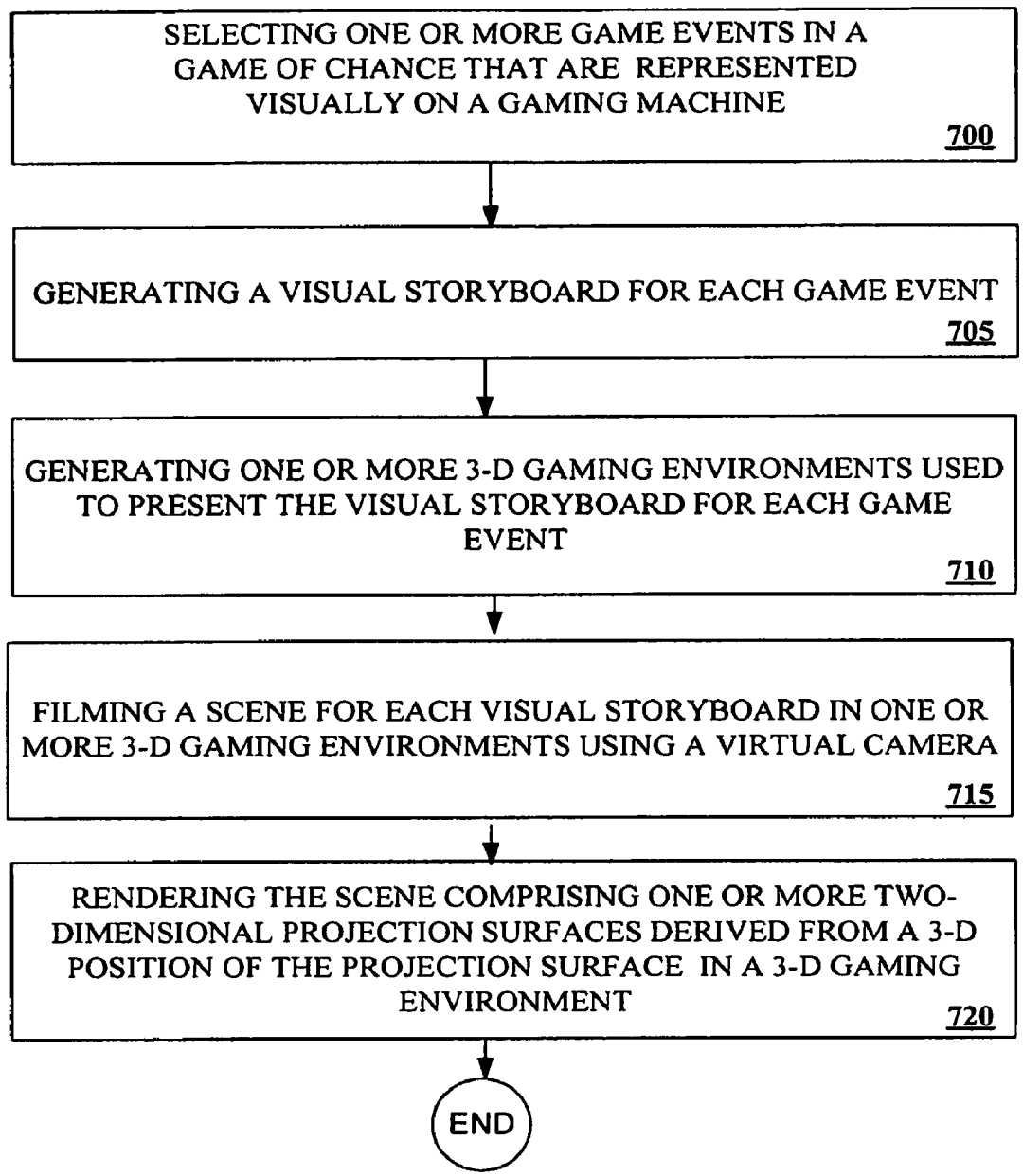
FIG. 7 is a flow chart depicting a method for generating a game of chance using a virtual gaming environment.

FIG. 7 is a flow chart depicting a method for generating a game using a 3-D virtual gaming environment. In 700, game events that comprise a game of chance played on the gaming machine and are represented visually are selected. In 705, a 3-D visual storyboard describing a scene in one or more virtual gaming environments is generated for each game event. The scene information may include virtual camera positions as a function of time in one or more gaming environments. For instance, a story board for cards being dealt in a card game may describe a pair of 3-D hands dealing the card over a gaming table with a virtual camera positioned directly above the gaming table looking down at the hands. In 710, a scene corresponding to the 3-D visual storyboard for each game event is generated in one or more 3-D virtual gaming environments. In 715, a scene corresponding to the visual storyboard for each game event is "filmed" in the one or more 3-D gaming environment. Filming each game event in the 3-D gaming environment comprises selecting a sequence of virtual camera positions and angles in the one or more 3-D gaming environments. In some embodiments, a player may control the position of the virtual camera in some manner. In 720, a sequence of 2-D projection surfaces (e.g. virtual camera images) derived from three-dimensional coordinates of surfaces in the 3-D gaming environment are rendered to a display screen on the gaming machine.

In the present invention, multiple "photographs" may be simultaneously generated from multiple virtual cameras located in one or more 3-D gaming environments on a gaming machine. The photographs may be displayed on one or more display screens available on the gaming machine. In addition, virtual cameras may be located in virtual 3-D gaming environments located on remote gaming devices, such as remote servers or other gaming machines, in communication with the local gaming machine. For instance, a plurality of linked gaming machines may "share" a 3-D gaming environment and players on each of the plurality of gaming machines may be able to see activities of other players in the "shared" 3-D gaming environment and possible interact with other players in the shared 3-D gaming environment. For instance game players may be able to play games against other game players or play games with other game players. The gaming machines may be linked via a local area network, a wide area network, the Internet, private intranets and virtual private intranets.

A plurality of photographs from virtual cameras in one or more 3-D gaming environments may be arranged as a number of smaller game windows on a display screen on the gaming machine. For example, the display screen may be divided into four equally sized game windows. As another example, a smaller game window may be generated within a larger game window on the display screen like picture-in-picture on a Television. The multiple game windows may contain photographs generated from 3-D virtual gaming environments both local and remote to the gaming machine. In addition, the multiple game windows may contain information from other sources. For instance, the game windows may each contain entertainment content such as an advertisement, news, stock quotes, electronic mail, a web page, a message service, a locator service or a hotel/casino service, a movie, a musical selection, a casino promotion and a broadcast event. Further, the windows may contain traditional casino games generated from 2-D objects.

Figure 8:
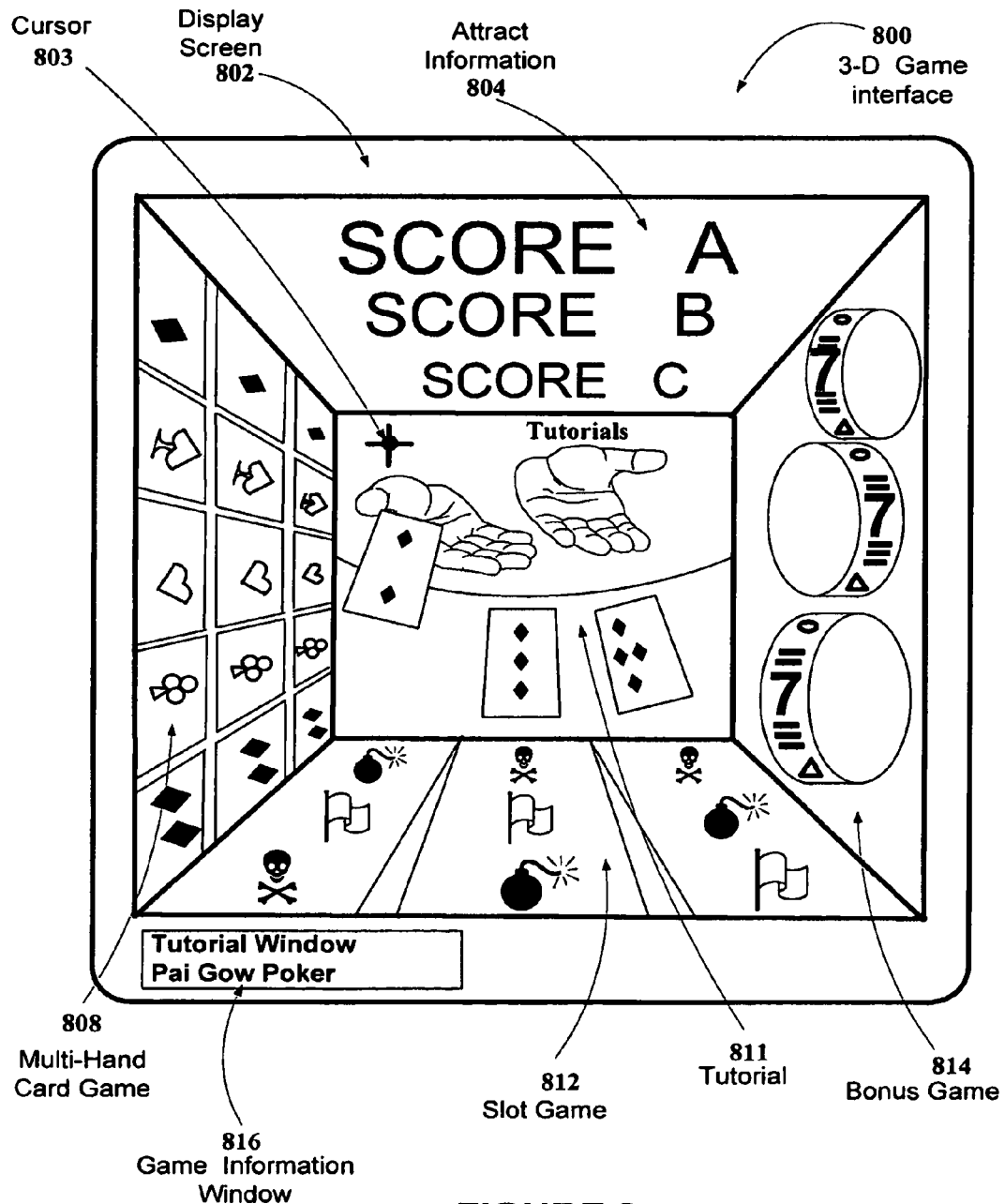
FIGS. 8 and 9 are perspective drawings of a 3-D interface for a gaming machine.
Figure 9:
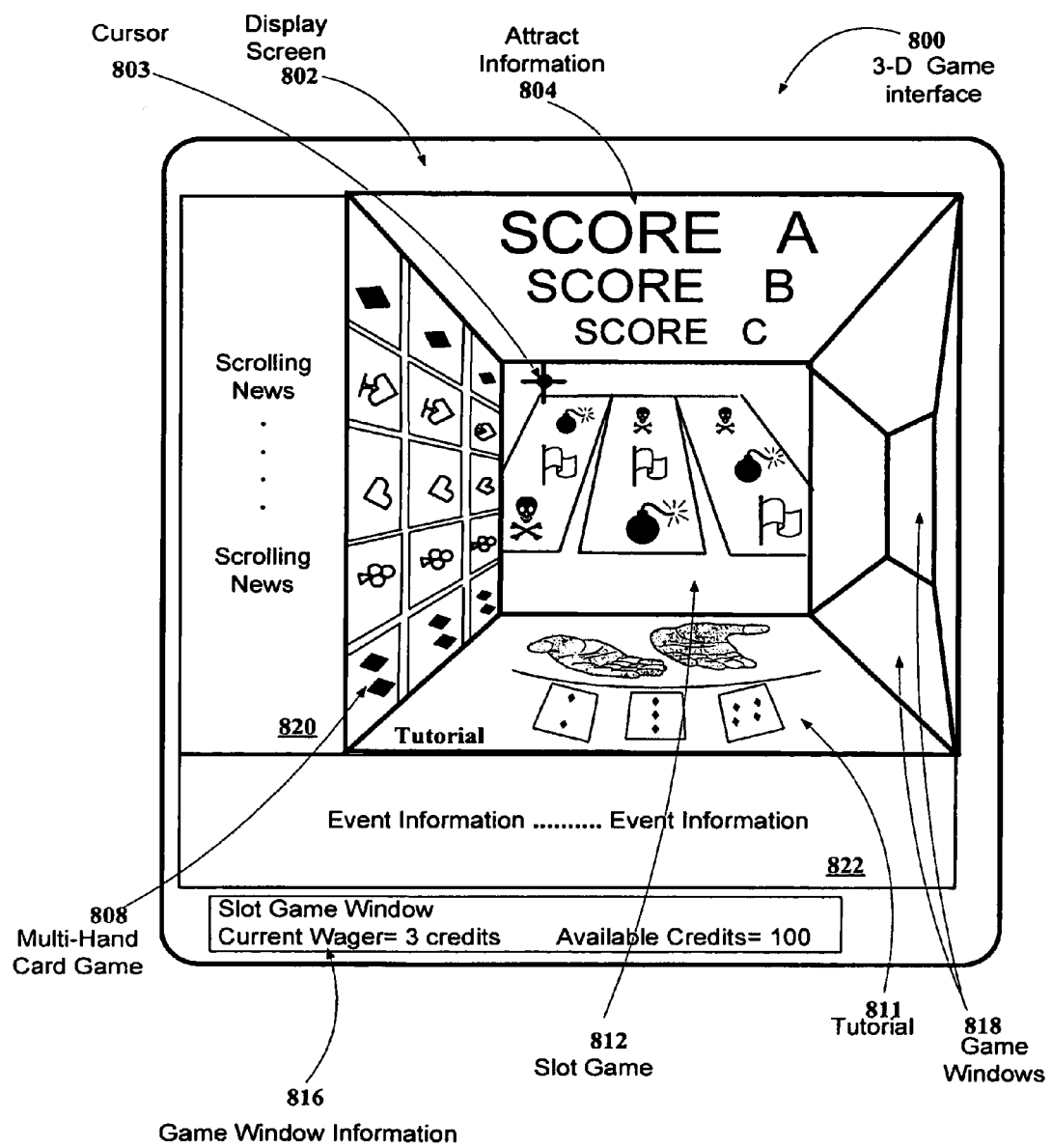

The present invention is not limited to windows arranged in an essentially planar manner on the display screen, i.e. rectangular windows arranged side by or over-layered on top of one another. A 3-D interface may be employed where the game windows are arranged in 3-D geometric pattern. In one embodiment, the 3-D interface may be a virtual 3-D gaming environment used to organize gaming information for viewing by a game player. FIGS. 8 and 9 are perspective drawings of a 3-D interface 800 for a gaming machine for one embodiment of the present invention.

In FIG. 8, six 3-D game windows are arranged on a display screen 802. Five of the 3-D game windows, 804, 808, 811, 812 and 814 are arranged in a cubic manner and one game window, 816, is displayed on a surface essentially parallel to the display screen. The cubic arrangement of the windows may be generated by rendering an open box in a 3-D virtual gaming environment. The five sides of the box are each used as a game window. Next, the game information shown in each of the five 3-D game windows are rendered to the 5 sides of the box. Then, a virtual camera positioned directly above the box may be used to render the photograph displayed on the display screen 802. With this approach any of the methods described above with regard to manipulating a virtual camera in a virtual camera in a 3-D gaming environment may be applied to the 3-D interface 800.

In FIG. 8, game window 804 is used to display attract information, game window 814 is used to display a bonus slot reel game, game window 812 is used to display a slot game, game window 808 is used to display a multi-hand card game and game window 811 is used to display a gaming tutorial. The displaying of information in the 3-D interface 800 may involve multiple transformations and rendering in different game environments. For instance, the multi-hand card game may be rendered in a first gaming environment. Then, a virtual camera in the first gaming environment may be used to generate a photograph showing a portion of the multi-hand card game (e.g. 3-D to 2-D transformation). Then, the photograph may be rendered in the game window 808 in the 3-D interface virtual environment (2-D to 2-D transformation). Next, a virtual camera in the 3-D interface environment may be used to render a photograph including game window 808 which is displayed on at least one display screen on the gaming machine (3-D to 2-D transformation). Game information may also be directly rendered into game windows in the 3-D interface virtual environment. For instance, the attract information in game window 804 may be directly rendered in the 3-D interface virtual environment.

The information in each of the windows is mapped to a particular side of the cube in the 3-D interface gaming environment. In one embodiment, a user of the 3-D interface may be able manipulate the mapping of the game windows. For example, a user may be able to exchange the position of various game windows such as exchanging the position of windows 811 and window 812 (see FIG. 9). When the game windows are exchanged, the 3-D interface may appear to rotate or move in some manner and other game windows may appear on the display screen while other windows may move off of the display screen. As another example, when the mapping is changed, the game windows may be re-rendered with the game information in each of the windows swapped.

Game window 816 is used to convey game window information about active game windows on the display screen 802. An "active game window" is a game window that may be operated actively by a user of the gaming machine. The user may use an input mechanism on the gaming machine such as a touch screen or mouse with cursor 803 to select a window for activation. In FIG. 8, the active game window is 811 which is being used to present a tutorial for playing a card game. Game 816 indicates that the tutorial is for "Pai gow poker." The user may move a cursor over different game windows in the 3-D game interface to obtain information about each game window. For instance, when the cursor 803 is moved from game window 811 to game window 812, the information in the game information window 816 may change to indicate that game window 812 is a slot game.

In one embodiment, the game windows may contain shared information. For instance, the multi-hand card game window 808 may be a shared game where each of the three card hands is played by a different player and the players are competing against one another. Therefore, the game window 808 may be used to participate in a card game tournament but also engage in other activities while watching the activities occurring in the game tournament. As another example, two players may be able to compete in a game of checkers. In another example, the bonus game 814 window may display a bonus game that is triggered by the activities of multiple players linked together on different gaming machines. Further, the bonus game may be visible to each of the players participating in the bonus game.

The players playing the shared game may be participating via different gaming machines. To share the game, the gaming machines may be linked via a local area network, a wide area network or combinations thereof. A remote gaming device in communication with a group of gaming machines, such as game sharing server or a tournament game server, may also be used to enable game sharing between groups of gaming machines.

Updates of game windows may occur in a simultaneous manner. Thus, while a game player is using a first game window, information in other game windows may be updated. For instance, while the game player is watching the tutorial in game window 811 updates of the multi-hand card game window 808, such as cards being dealt, may be occurring. As another example, a live video feed such as sporting event may be viewed in one of the game windows. As the live video feed is continually updated, the game player may play a game of chance in one of the other game windows.

In another embodiment, the multi-hand card game in the multi-hand card game window 808 may be a multi-hand poker game. The multi-hand poker game may be rendered in a 3-D multi-hand poker hand gaming environment. The number of hands rendered may range from 1 to a very large number of hands (e.g. millions) However, a thousand poker hands may be a practical upper limit. In this game, the player may select the number of hands to be played by betting. The player may select coins (wager amount) per hand and increment the bet until the player reaches the desired number of hands or all the hands available for betting (e.g. the maximum number) have been selected. The maximum number of hands available for betting may be some reasonable limit, such as 1000. The maximum number of hands can be set in the gaming machine such is in the game configuration or paytable configuration.

In one embodiment of the multi-hand poker game generated in a 3-D gaming environment, the player initiates a game and a first hand consisting of five cards is dealt with the types of cards showing (e.g. face card or number card as well as a suit). The remaining hands are dealt showing only card backs. When the player holds a card, the other hands show the same hold cards, When a player unholds, the other hands unhold. When the player selects redraw, the hands all start drawing the new cards from unique decks (with the original hold cards removed from all of them). To display the game, a virtual camera could fly over each of hands as they are being rendered to generate an effect similar to the text at the beginning of star wars (e.g. the hands appear to be scrolling up the screen in "space", shrinking and disappearing into the horizon as the hands move farther away. Once the virtual camera reaches the last hand, it can reset to the main hand i.e., the original dealt hand, which now has its own unique rendered cards. The user could also manually control the camera to review the cards, or start playing again. In addition, the cards could be displayed in multiple game windows of the 3-D interface 800.

In FIG. 9, another embodiment of the 3-D interface 800 is shown. The cubic arrangement of the windows has been reduced in size in the display screen 802 as compared to FIG. 8. An important advantage of the present invention is the ability to scale objects (either larger or smaller) and then render objects in the virtual gaming environment with proper perspective. When 2-D objects are scaled by any significant amount, the scaling can distort the rendered objects reducing the quality of any graphics presentation using the scaled 2-D object.

On the display screen 802 in FIG. 9, the mapping of the game windows has been changed as compared to FIG. 8. The tutorial game window 811 has been exchanged with the slot game window 812. The slot game window has become the "active" window as indicated by the cursor 803. The game information window indicates that the player has wagered 3 credits on the slot game shown in the slot game window 812 and has 100 credits available for game play.

The bonus game window 814 in FIG. 8 has been replaced with 5 additional game windows 818 arranged in a cubic pattern. These game windows may be selected by a user and rotated into view to replace game windows 804, 808, 811 and 812. The present invention is not limited to the arrangement of game windows as shown in FIGS. 8 and 9 which are presented for illustrative purposes only. A 3-D game interface environment may be generated that uses nearly an unlimited variety of game window arrangements. For example, the game windows may be arranged on any combination of different polyhedron surfaces. Some game windows may be rendered on curved game surfaces and the colors of different game windows may vary to aid a user in identifying various features of the 3-D game interface. For instance, the active game window may be displayed with a green border.

Two additional game windows, 820 and 822 around game windows, 804, 806, 808, 811, 812 and 818. Game window 820 displays scrolling news while game window 822 displays casino event information. Game windows 820 and 822 may be used to display button menus, game service menus, entertainment content and any other type of information that may be displayed in any other game window. In one embodiment, game windows 820 and 822 may be displayed and then removed. When the game windows, 820 and 822, are removed the other game windows in the screen may be enlarged to fill the space occupied by game windows 820 and 822. The shrinking and enlarging of the windows may be initiated by a player playing the game or may be triggered by game events occurring during game play on the gaming machine.

Figure 10:
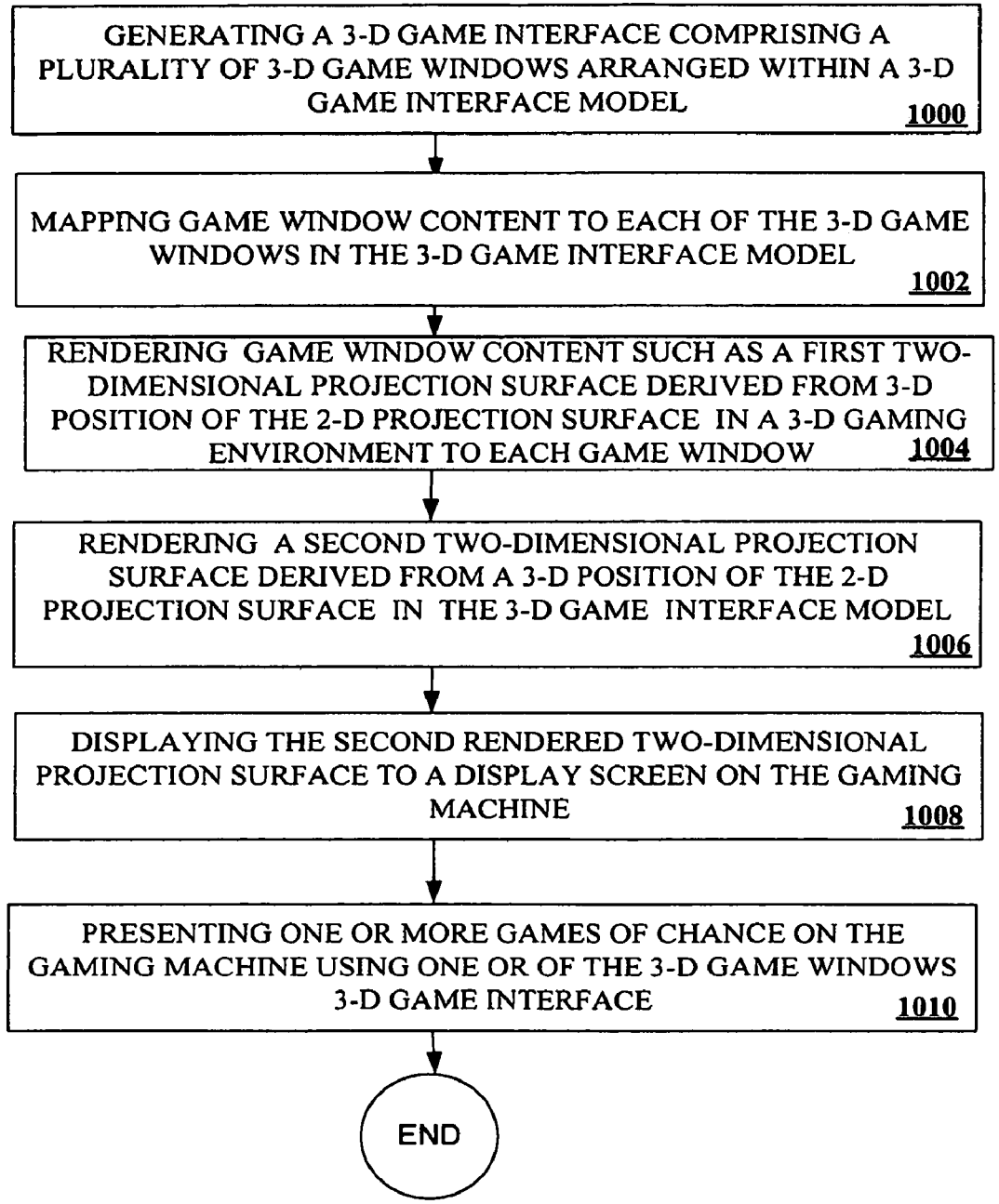
FIG. 10 is a flow chart depicting a method of playing a game on a gaming machine using a 3-D interface.

FIG. 10 is a flow chart depicting a method of playing a game on a gaming machine using a 3-D interface. In 1000, a 3-D game interface is generated. The 3-D game interface comprises a plurality of game windows arranged within a 3-D game interface model or environment as described with respect to FIGS. 8 and 9. In 1002, game window content is mapped to each of the 3-D game windows in the 3-D game interface model. The game window content may be a game of chance, bonus game, entertainment content as previously described, or even a blank window. The game window content map may be used to allow the contents in each of the game windows to be redistributed in different game windows to create a new game window content map. For example, as described above, the content in two game windows may be swapped.

In 1004, the game window content in each game window is rendered to the game window. In one embodiment, a first two-dimensional projection surface (e.g., an image from a virtual camera) derived from a 3-D coordinates of a first surface in a 3-D gaming environment may be rendered to one or more of the game windows in 3-D game interface model. In 1006, a virtual camera in the 3-D game interface model may be used to render a second two-dimensional projection surface derived from a 3-D coordinates of a second surface in the 3-D game interface model. In 1006, the rendered second two-dimensional projection surface may be displayed to at least one display screen on the gaming machine. In 1010, one or more games of chance may be presented on the gaming machine using one or more of the 3-D game windows in the 3-D game interfaces. As previously described, multiple games of chance presented in multiple game windows may be played in a sequential or parallel manner.

Figure 11:
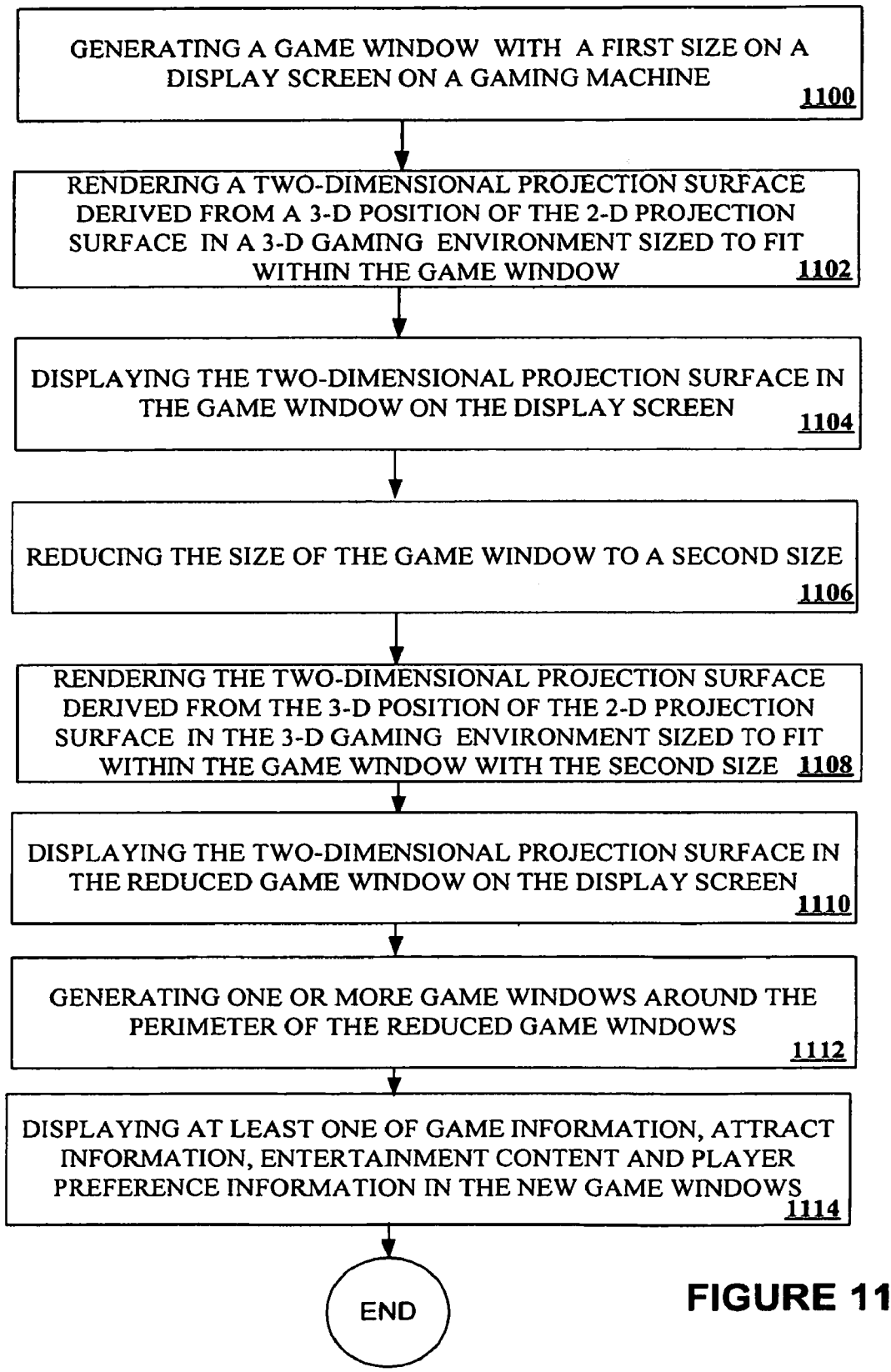
FIG. 11 is a flow chart depicting a method of displaying game information on a gaming machine.

FIG. 11 is a flow chart depicting a method of displaying game information on a gaming machine. In 1100, a first game window with a first size is generated on a display screen on the gaming machine. The first game window may be part of a 3-D game interface comprising multiple game windows as described with respect to FIGS. 8, 9 and 10. In 1102, a first two dimensional projection surface derived from 3-D coordinates a surface in a 3-D gaming environment (e.g., an image from a virtual camera in the 3-D gaming environment), is rendered to fit within the size of the first game window. In 1104, the rendered first two-dimensional projection surface is displayed in the first game window on the display screen.

In 1106, the first game window is reduced to a second size. In 1108, the same game window content is rendered to fit within the reduced first game window. The game window content of the first game window may be held constant during a game window size transition but may be later varied after the transition of the game window to the new size. Therefore, a second projection surface derived from the same 3-D coordinates of the surface in the 3-D gaming environment as in 1102 is rendered accounting for the new window size. In 1111, the second two-dimensional projection surface is displayed in the reduced first game window on the gaming machine.

To account for a change in game window size, the rendering may involve adjusting the parameters of a transformation performed by a virtual camera in the 3-D gaming environment to produce a "photograph" that fits in the window. This transformation may be performed while the 3-D coordinates of a captured surface in the 3-D gaming environment remain constant. In addition, the transition between the first game window size and the second game window size may be gradual. Thus, the first game window may be rendered in a series of sizes going from the first size to the second size where the 3-D coordinates of the captured surface in the 3-D gaming environment remain constant but the "photograph" from the virtual camera is rendered to fit in each of the window sizes generated during the transition. The method is not limited to reducing the size of game windows and may also be applied to increasing the size of game windows.

In 1112, one or more new game windows may be generated in the display space created by the reduction in size of the first game window. In 1114, information such as but not limited to game information, attract information, entertainment content, player preference information and gaming machine operational information may be displayed in the new game windows. In one embodiment, the new game windows may be removed and the first game window may be returned to its original size.

An input location on a display screen of a gaming machine is often an important parameter for operating a gaming machine. The input location on the display screen may be used to determine whether an input button modeled on the display screen has been activated. The input location on a display screen may be determined from a cursor location on the display screen or an input to a touch screen on top of the display screen. The cursor may be moved by a mouse, touch pad or joystick on the gaming machine. Then, a input location of the cursor may be specified by using an input mechanism on the gaming machine. For instance, a user may hit an "enter button" on a mouse or a joy-stick.

In traditional gaming machines, the position of input buttons or input surfaces modeled on a display screen on the gaming machine are fixed. As described above, input buttons that may be used with a touch screen or a screen cursor and screen cursor controller may be modeled in a 3-D gaming environment. In the present invention, the position of these buttons on the display screen may vary as a function of time. For instance, the position of an input button or input surface modeled in a 3-D gaming environment may change on the display screen when a position of a virtual camera in the 3-D gaming environment is changed or an object in the 3-D gaming environment is moved. The position of the input buttons may change as a result of user input into the gaming machines or some other game event. For instance, the position of the button on the display screen may be change or an area occupied by the input button on the display screen may change as a view of the input button is changed. Thus, methods are needed to account for a change of position or size of an input button modeled on the display screen to determine when an input button has been activated. A few methods of accounting for input buttons with variable positions and sizes are described as follows with respect to FIGS. 12A-12E and FIG. 13.

Figure 12:
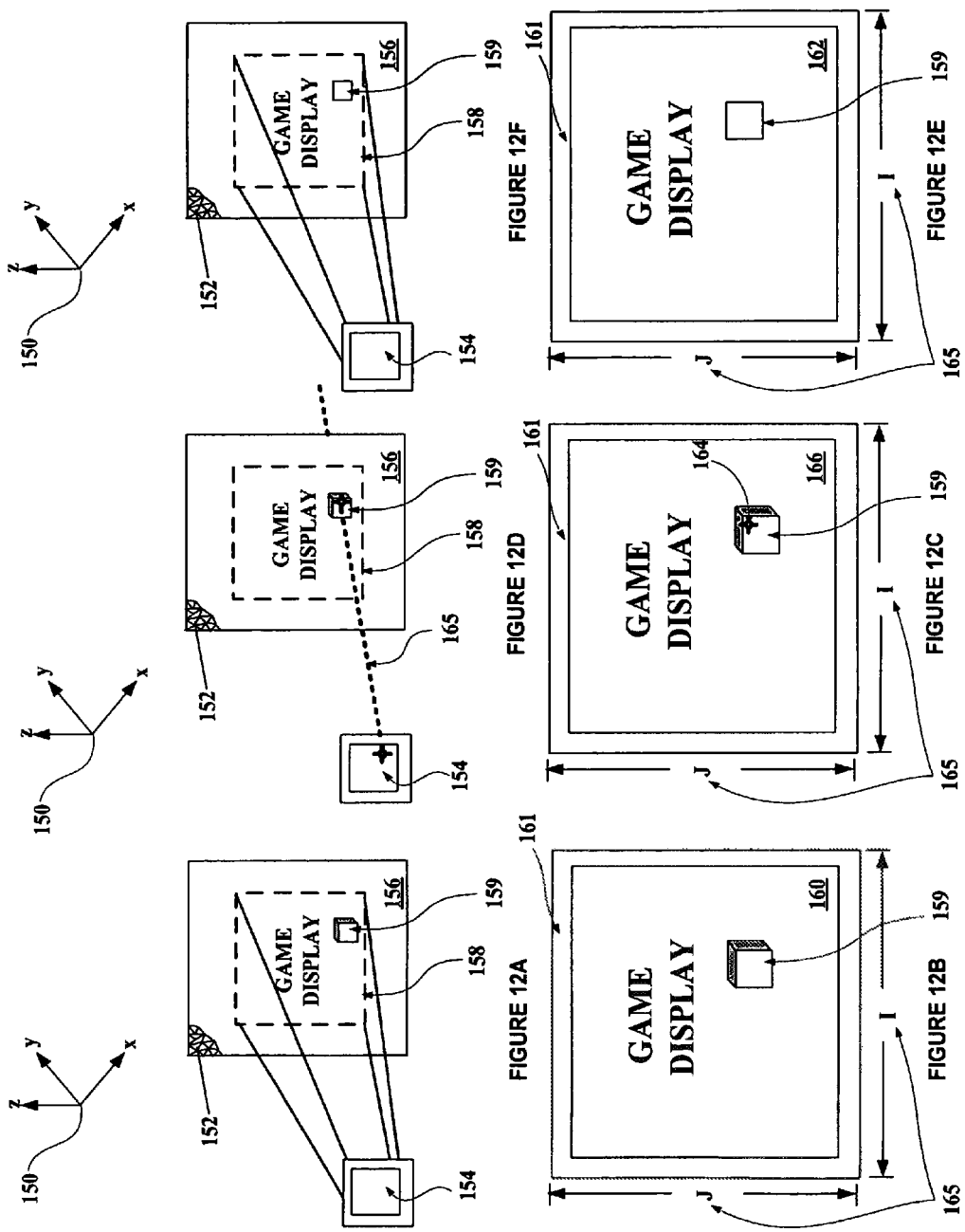
FIGS. 12A-12E are perspective drawings of screen input interfaces modeled in a 3-D gaming environment on a gaming machine.

FIGS. 12A-12E are perspective drawings of screen input interfaces modeled in a 3-D gaming environment on a gaming machine. In FIG. 12A, a game display 158 is on a surface 156 comprising a plurality of elements 152 modeled in a 3-D gaming environment with coordinate system 150. A 3-D dimensional input button 159 is also modeled in the game display 158. A virtual camera 154 is positioned in the game environment and used to render a photograph of the game display 158 with the input button 159. In FIG. 12 B, the rendered photograph 160 is displayed in game window 161 which may be displayed on a portion of a display screen on a gaming machine. The game window 161 has dimensions I by J which may correspond to a pixel length and a pixel width on the gaming machine. The game window 161 may be divided up into a 2-D grid of pixel locations. The input button 159 occupies a certain number of pixels on the game window 161.

In FIG. 12C, a screen input is detected at the screen location specified by the cross hairs 164. The screen input may be generated by a touch screen or some other input device on the gaming machine. In one embodiment of the present invention, the 2-D coordinates of the screen location and knowledge of the transformation used to render the 2-D view from the 3-D virtual gaming environment on the display screen may be used to generate a line in the 3-D gaming environment.

In FIG. 12D, an "input line" 165 is generated in the 3-D gaming environment from the 2-D coordinates of the screen location at 164 and a transformation used to render the 2-D view 166 in the game window 161 in FIG. 12C. The coordinates of the "input line" are checked to determine whether the input line intersects with an input button modeled in the 3-D gaming environment. In FIG. 12D, the line 165 intersects with input button 159. When the "collision" is detected, the gaming machine may determine whether the input button is "active." When the input button is active, the gaming machine may implement a gaming event specified by the input button. For instance, the gaming event may be to initiate a game on the gaming machine. When the input button is not active, the gaming machine may ignore the collision. When a non-rectangular coordinate system is used to model the 3-D gaming environment, the input line may not be straight and may be a curved line. Often the input line is referred to a as a ray and determining whether a collision has occurred is referred to as casting a ray.

After a collision has been detected on an "active" input button, the input button may be animated in some manner. For instance, the input button may be shown sinking into a surface from which it protrudes as if it were physically depressed. In FIG. 12 D, the input button 159 is shown in a depressed position in the 3-D gaming environment. In FIG. 12 E, the depressed button is rendered in a photograph 162 shown in the game window 161.

Figure 13:
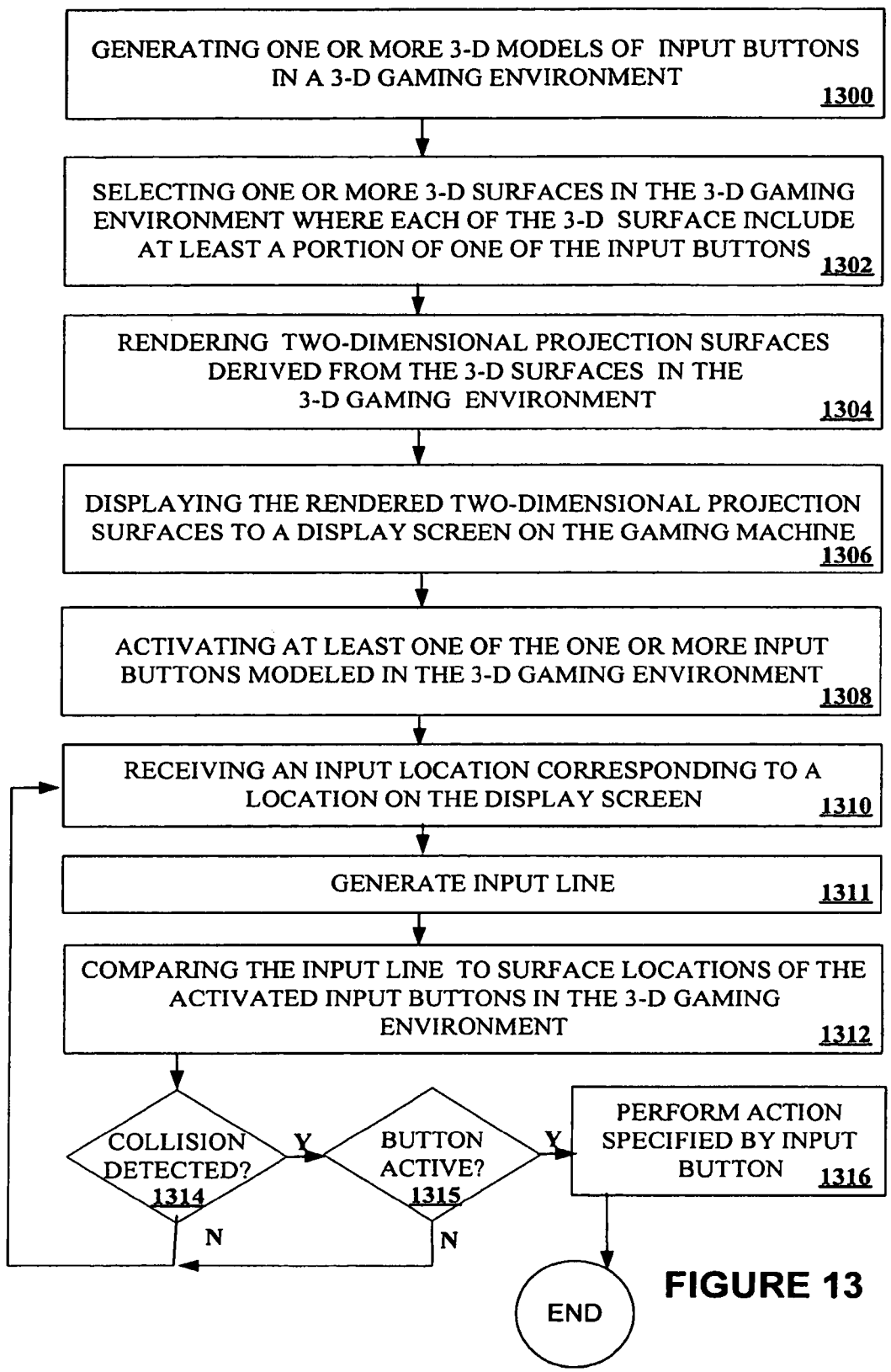
FIG. 13 is a flow chart depicting a method of detecting input button collisions for input buttons modeled in a 3-D gaming environment on a gaming machine.

FIG. 13 is a flow chart depicting a method of detecting input button collisions for input buttons modeled in a 3-D gaming environment on a gaming machine. In 1300, one or more 3-D models of input buttons are generated in a 3-D gaming environment. In 1302, a 3-D surface in the 3-D gaming environment is selected that includes at least portion of one or more input buttons modeled in the 3-D gaming environment. In 1304, a two-dimensional projection surface is rendered from the selected 3-D surface in the gaming environment. As noted above, the 3-D surface may be considered a 3-D object and a 2-D projection surface may be considered a 2-D image. In 1306, the rendered two-dimensional projection surface is displayed to at least one display surface on a gaming machine.

In 1308, at least one or the one or more input buttons modeled in the 3-D gaming environment are activated. In 1310, an input location corresponding to a 2-D coordinate on a display screen is received. In 1311, an input line is generated in the 3-D gaming environment based on the coordinate transformation used to render the two-dimensional projection surface in 1304. In 1312, the input line is compared to 3-D surface locations in the 3-D gaming environment.

In 1314, when a collision between the input line and an input buttons in the 3-D gaming environment are not detected, the screen input is ignored by the gaming machine. In 1315, when a collision between the input line and an input button has been detected, the gaming machine determines whether the input button is active. When the input button is not active, the screen input is ignored by the gaming machine. In 1316, when the input button is active, the gaming machine may execute the action specified by the input button. For instance, a game of chance may initiated on the gaming machine.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box or a secondary display. Both of these types of gaming machines may be modeled in a virtual gaming environment stored on a gaming machine.

What is claimed is:

1. In a gaming machine comprising a master gaming controller, a display device, and a memory device, a method of displaying a plurality of game windows on the display device wherein at least one of the game windows is used to present a game of chance, the method comprising:
    generating a plurality of 3-D game windows arranged in a 3-D game interface model wherein the 3-D game interface model comprises a 3-D geometric surface description for each of the plurality of game windows;
    mapping game window content to each of the 3-D game windows;
    rendering first game window content in a first 3-D game window;
    rendering second game window content in a second 3-D game window;
    rendering the first game window content in the second 3-D game window;
    rendering the second game window content in the first 3-D game window
    rendering a two-dimensional image derived from a three-dimensional object in the 3-D game interface model stored in the memory device on the gaming machine; and
    displaying the rendered two-dimensional image to the display device on the gaming machine.

2. The method of claim 1, further comprising:
    activating at least one of the plurality of 3-D game windows.

3. The method of claim 1, further comprising:
rotating the 3-D game interface model.

4. The method of claim 1, further comprising:
presenting a game of chance in at least one of the plurality of 3-D game windows.

5. The method of claim 1, further comprising:
updating the game window content in one or more of the game windows while presenting the game of chance in at least one of the game windows.

6. The method of claim 1, wherein the game window content is selected from the group consisting of a game of chance, a bonus game, an advertisement, news, stock quotes, electronic mail, a web page, an instant message service, a locator service or a hotel/casino service, a movie, a live-video feed, a musical selection, a casino promotion, a broadcast event, a maintenance operation, a player tracking service, a drink menu and a snack menu.

7. The method of claim 1, wherein the game of chance is selected from the group consisting of a slot game, a keno game, a poker game, a pachinko game, a video black jack game, a bingo game, a baccarat game, a roulette game, a dice game and a card game.

8. The method of claim 1, wherein at least one game window on the gaming machine is used to play a game against another game player and wherein said another game player plays the game on a second gaming machine.

9. The method of claim 1, wherein at least one game window is used to share a bonus game with a group of game players each game player playing a different gaming machine.

10. The method of claim 2, further comprising:
receiving an input signal to initiate a game of chance in at least one of the active activated 3-D game windows.

11. The method of claim 8, wherein the gaming machine and the second gaming machine are connected via at least one of a local area network, a wide area network, the Internet or combinations thereof.

12. The method of claim 9, wherein the different gaming machines for each game player in the group of game players is connected via at least one of a local area network, a wide area network, the Internet or combinations thereof.

13. In a gaming machine comprising a master gaming controller, a display device and a memory device, a method of displaying a plurality game windows on the display device wherein at least one of the game windows is used to present a game of chance, the method comprising:
generating a plurality of 3-D game windows arranged in a 3-D game interface model wherein the 3-D game interface model comprises a 3-D geometric surface description for each of the plurality of game windows;
mapping game window content to each of the 3-D game windows;
rendering game window content to each of the 3-D game windows;
rendering a two-dimensional image derived from a three-dimensional object in the 3-D game interface model stored in the memory device on the gaming machine;
displaying the rendered two-dimensional image to the display device on the gaming machine; and
rendering a two-dimensional image derived from a 3-D object in a three-dimensional gaming environment stored in the memory device on the gaming machine to a 3-D game window in the 3-D game interface model.

14. In a gaming machine comprising a master gaming controller, a display device and a memory device, a method of displaying game information in a game window, the method comprising:
generating a game window with a first size;
rendering a first two-dimensional image derived from a three-dimensional object in a three-dimensional gaming environment stored in the memory device on the gaming machine to fit within the first size of the game window;
displaying on the display device the rendered first two-dimensional image within the game window;
changing the game window to a second size;
rendering a second two-dimensional image derived from the 3-D object in the three-dimensional gaming environment stored in the memory device on the gaming machine to fit within the second size of the game window; and
displaying on the display device the rendered second two-dimensional image within the game window
wherein the game information is used to play a game of chance on the gaming machine.

15. The method of claim 14, further comprising:
wherein the second size of the game window is smaller than the first size of the game window;
generating one or more new game windows in a game window area around the game wherein the game window area is a difference in area between an area of the first size of the game window and an area of the second size of the game window; and
displaying game information in the one or more new game windows.

16. The method of claim 14, further comprising:
rendering a sequence of second two-dimensional images derived from the 3-D object in the three-dimensional gaming environment stored in the memory device on the gaming machine wherein each two-dimensional image in the sequence is sized to fit within a sequence of game windows between the first size and the second size.

17. The method of claim 14, wherein at least one of the rendered two-dimensional images is used to provide a game history.

18. The method of claim 15, further comprising:
removing the new one or more new game windows; and
returning the game window to the first size.

19. In a gaming machine comprising a master gaming controller, a display device and a memory device, a method of activating an input button modeled in a 3-D gaming environment and displayed on the display device, the method comprising:
generating one or more 3-D object models of input buttons in a 3-D gaming environment used to play a game of chance on the gaming machine;
rendering a two-dimensional image derived from a three-dimensional object in a three-dimensional gaming environment stored in the memory device on the gaming machine wherein the three-dimensional object comprises at least a portion of one or more the input buttons modeled in the 3-D gaming environment;
displaying the rendered two-dimensional projection surface to the display device on the gaming machine;
receiving an input signal including at least an input location corresponding to a location on the display device displaying the rendered two-dimensional image;
generating an input line in the 3-D gaming environment using the input location; and
detecting a collision between the input line and at least one of an input button modeled in the 3-D gaming environment.

20. The method of claim 19, further comprising:
comparing 3-D coordinates of the input line in the gaming environment to 3-D coordinates of input buttons modeled in the 3-D gaming environment.

21. The method of claim 19, further comprising:
performing an action specified by an input button corresponding to the received input location.

22. The method of claim 19, further comprising:
activating one or more input buttons modeled in the 3-D gaming environment.

23. The method of claim 19, wherein the input signal is generated from a touch screen.

24. The method of claim 19, wherein the input location on the display device corresponds to a cursor location on the display device.

25. The method of claim 22, further comprising:
ignoring a detected collision between the input line and an input button, when the input button is not activated.

* * * * *